(12) United States Patent
Takahashi et al.

(10) Patent No.: US 9,219,307 B2
(45) Date of Patent: Dec. 22, 2015

(54) WIRELESS COMMUNICATION DEVICE AND METHOD FOR DISPLAYING ESTIMATED DIRECTION AND POSITION OF A TARGET FOR WIRELESS COMMUNICATION

(75) Inventors: Kazuaki Takahashi, Tokyo (JP); Masayuki Orihashi, Kanagawa (JP); Suguru Fujita, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 266 days.

(21) Appl. No.: 13/876,919

(22) PCT Filed: Sep. 27, 2011

(86) PCT No.: PCT/JP2011/005430
§ 371 (c)(1),
(2), (4) Date: Mar. 29, 2013

(87) PCT Pub. No.: WO2012/042851
PCT Pub. Date: Apr. 5, 2012

(65) Prior Publication Data
US 2013/0189929 A1 Jul. 25, 2013

(30) Foreign Application Priority Data

Sep. 30, 2010 (JP) .................................. 2010-222765

(51) Int. Cl.
*H01Q 3/24* (2006.01)
*G01S 3/38* (2006.01)
(Continued)

(52) U.S. Cl.
CPC .. *H01Q 3/24* (2013.01); *G01S 3/38* (2013.01); *G01S 5/0242* (2013.01); *G01S 5/12* (2013.01); *H04B 7/0617* (2013.01); *H04B 7/0695* (2013.01); *H04W 16/28* (2013.01)

(58) Field of Classification Search
None
See application file for complete search history.

(56) References Cited

U.S. PATENT DOCUMENTS 8,200,184 B2 6/2012 Hamada et al.
8,494,517 B2 7/2013 Awad et al.
(Continued)

FOREIGN PATENT DOCUMENTS

JP 11-355305 A 12/1999
JP 2001-128223 A 5/2001
(Continued)

OTHER PUBLICATIONS

International Search Report, mailed Dec. 27, 2011, for International Application No. PCT/JP2011/005430, 2 pages.

*Primary Examiner* — Alejandro Rivero
(74) *Attorney, Agent, or Firm* — Seed IP Law Group PLLC

(57) ABSTRACT

A wireless communication device transmits and receives a signal by a wireless communication using a millimeter wave frequency band. The wireless communication device includes an antenna section having directivities in a plurality of different directions, an antenna control section adapted to form a directivity in a prescribed direction among the plurality of directivities of the antenna section, a direction and position estimation section adapted to estimate direction and position information of a wireless communication device to be communicated with, which is a target for the wireless communication, in accordance with a receiving signal received by the antenna section having the directivity formed, and a display section adapted to display the estimated direction and position information of the wireless communication device to be communicated with.

10 Claims, 14 Drawing Sheets

(51) Int. Cl.
*H04B 7/06* (2006.01)
*G01S 5/02* (2010.01)
*G01S 5/12* (2006.01)
*H04W 16/28* (2009.01)

(56) References Cited

U.S. PATENT DOCUMENTS

| | | |
|---|---|---|
| 2004/0114535 A1 | 6/2004 | Hoffmann et al. |
| 2005/0037822 A1 | 2/2005 | Regnier et al. |
| 2005/0073521 A1 | 4/2005 | Watanabe et al. |
| 2007/0189325 A1 | 8/2007 | Hoffmann et al. |
| 2007/0197229 A1* | 8/2007 | Kalliola et al. ............ 455/456.1 |
| 2009/0270065 A1 | 10/2009 | Hamada et al. |
| 2009/0315794 A1* | 12/2009 | Alamouti et al. ............. 343/753 |
| 2010/0014463 A1 | 1/2010 | Nagai et al. |
| 2010/0085257 A1 | 4/2010 | Kalliola et al. |
| 2010/0120423 A1 | 5/2010 | Awad et al. |
| 2010/0210221 A1* | 8/2010 | Takano et al. .................... 455/68 |
| 2010/0273428 A1* | 10/2010 | Kimura et al. ............... 455/63.3 |
| 2010/0309058 A1 | 12/2010 | Kalliola et al. |

FOREIGN PATENT DOCUMENTS

| | | |
|---|---|---|
| JP | 2002-058057 A | 2/2002 |
| JP | 2002-281468 A | 9/2002 |
| JP | 2002-323548 A | 11/2002 |
| JP | 2003-078945 A | 3/2003 |
| JP | 2004-354351 A | 12/2004 |
| JP | 2005-064855 A | 3/2005 |
| JP | 2005-065010 A | 3/2005 |
| JP | 2005-073007 A | 3/2005 |
| JP | 2005-156259 A | 6/2005 |
| JP | 2006-262175 A | 9/2006 |
| JP | 2007-524276 A | 8/2007 |
| JP | 2008-042432 A | 2/2008 |
| JP | 2009-527757 A | 7/2009 |
| JP | 2009-267844 A | 11/2009 |
| JP | 2010-525617 A | 7/2010 |
| WO | 2008/069245 A1 | 6/2008 |

* cited by examiner

FIG. 14

| No. | SSID | POSITION INFORMATION | PROFILE |
|---|---|---|---|
| 1 | OP1 | THE NORTH LATITUDE **DEGREE, THE EAST LONGITUDE **DEGREE | OP1-prof |
| 2 | OP2 | THE NORTH LATITUDE **DEGREE, THE EAST LONGITUDE **DEGREE | OP2-prof |
| 3 | HOME1 | THE NORTH LATITUDE **DEGREE, THE EAST LONGITUDE **DEGREE | -- |
| 4 | HOT1 | THE NORTH LATITUDE **DEGREE, THE EAST LONGITUDE **DEGREE | -- |
| 5 | FSPOT | THE NORTH LATITUDE **DEGREE, THE EAST LONGITUDE **DEGREE | FS-prof |
| 6 | HOMES2 | THE NORTH LATITUDE **DEGREE, THE EAST LONGITUDE **DEGREE | -- |
| 7 | OFFICE1 | THE NORTH LATITUDE **DEGREE, THE EAST LONGITUDE **DEGREE | -- |

WIRELESS COMMUNICATION DEVICE AND METHOD FOR DISPLAYING ESTIMATED DIRECTION AND POSITION OF A TARGET FOR WIRELESS COMMUNICATION

TECHNICAL FIELD

The present invention relates to a wireless communication device and a wireless communication method for detecting a device to be communicated with, which is a target for communication by using an antenna having directivity.

BACKGROUND ART

As one of connection forms to an internet, a wireless LAN (Local Area network) is widely propagated. The wireless LAN, which is different from a wired LAN, is one form of the LAN which can be connected to a network such as the internet without using a LAN cable. The wireless LAN is promoted to be standardized by the IEEE802.11. At present, there are standards of the IEEE802.11b, IEEE802.11g and IEEE802.11a.

The IEEE802.11b is the standard for carrying out a communication at a speed of about 11 Mbps at maximum by using a radio wave of a frequency band of 2.4 GHz. The IEEE802.11g is the standard for carrying out a communication at a speed of about 54 Mbps at maximum by using a radio wave of a frequency band of 2.4 GHz. The IEEE802.11a is the standard for carrying out a communication at a speed of about 54 Mbps at maximum by using a radio wave of a frequency band of 5.2 GHz. A device using the wireless LAN according to these standards constructs the network, so that the device can carry out a communication using the wireless LAN.

A wireless LAN device to be mounted on a vehicle disclosed in Patent Document 1 is known as one example of wireless LAN devices that a device based on the standard of such a wireless LAN is applied to a device to be mounted on a vehicle to carry out a wireless communication between the vehicle on which the device to be mounted on the vehicle is mounted and an external wireless base station.

Here, a structure and an operation of the wireless LAN device to be mounted on the vehicle of the Patent Document 1 will be described below by referring to FIG. 12 to FIG. 14. FIG. 12 is a block diagram showing an inner structure of the wireless LAN device 20 to be mounted on the vehicle. FIG. 13 is a flowchart for explaining a connecting procedure to a wireless LAN access point as a target for communication of the wireless LAN device 20 to be mounted on the vehicle. FIG. 14 is an explanatory view showing one example of a peripheral access point list.

In FIG. 12, the wireless LAN device 20 to be mounted on the vehicle includes, a system MPU21, a GPS receiver 22, a gyro-sensor 23a, a vehicle speed pulse sensor 23b, an HDD 24a, a DVD-ROM drive 24b, an image processing section 25, a display 26, an audio processing section 27, a microphone 28a, a speaker 28b, a control panel 29 and a wireless LAN module 30.

The operation of the wireless LAN 20 to be mounted on the vehicle will be described below. In FIG. 13, the wireless LAN device 20 to be mounted on the vehicle initially searches received signal intensity (RSSI) of a beacon signal broadcast from a wireless LAN access point (S401). The wireless LAN device 20 to be mounted on the vehicle forms an RSSI list of the wireless LAN access points existing in the periphery of a present position of the vehicle of its own (S402). The wireless LAN device 20 to be mounted on the vehicle forms the RSSI list to specify the wireless LAN access point available at this time.

Then, the wireless LAN device 20 to be mounted on the vehicle reads the peripheral access point list of the wireless LAN access points existing in the periphery of the present position of the vehicle of its own (S403). The peripheral access point list is previously formed and held by the wireless LAN device 20 to be mounted on the vehicle and periodically updated to the latest information.

FIG. 14 is a diagram showing one example of the peripheral access point list. In this example, "No.", "SSID", "position information" of the wireless LAN access point and "profile" are shown. The profile is a setting file including information necessary for connection to the wireless LAN access point. For instance, an MAC address, an encryption system and an encryption key thereof or the like are included.

The encryption system includes WEP, TKIP, AES or the like. The profile does not need to be previously coordinated with all the wireless LAN access points registered in the data base of the HDD 24a or the DVD-ROM drive 24b.

In FIG. 13, the wireless LAN device 20 to be mounted on the vehicle filters the wireless LAN access points in the peripheral access point list by using the RSSI list (S404). The RSSI list is a list of actually operating wireless LAN access points. However, the peripheral access point list is a list on a data base to the end. Accordingly, it is not obvious that the position information includes even information as to whether or not the wireless LAN access points are actually located or whether or not the wireless access points actually operate. Thus, the wireless LAN device 20 to be mounted on the vehicle puts the peripheral access point list on the RSSI list, so that the wireless LAN device 20 to be mounted on the vehicle can list up only the wireless LAN access points which can be actually connected.

The wireless LAN device 20 to be mounted on the vehicle selects the wireless LAN access point having the profile from the peripheral access point list in which a filtering process is finished (S405) and tries to carry out a network connection to the wireless LAN access point (S406). When the connection is established, the wireless LAN device 20 to be mounted on the vehicle monitors a connection state and a distance to the access point (S407), and when the connection is hardly maintained, the wireless LAN device 20 to be mounted on the vehicle resumes the above-described series of connecting procedure (S407, YES).

In such a way, the wireless LAN device 20 to be mounted on the vehicle can operate so as to cooperate with a car navigation device which can specify the preset position of the vehicle. Further, the wireless LAN device 20 to be mounted on the vehicle can simply set profile information necessary for connecting with the wireless LAN access point and connect with the wireless LAN access point.

RELATED ART DOCUMENTS

Patent Document

Patent Document 1: JP-A-2006-262175

SUMMARY OF THE INVENTION

Problems to be Solved by the Invention

However, since a usual wireless communication device including the wireless LAN device to be mounted on the vehicle of the Patent Document 1 carries out the wireless communication based on the above-described IEEE802.11, a radio wave used in the wireless communication is a microwave of 2.4 GHz or 5.2 GHz. In the usual wireless communication device, since a radio signal in a microwave frequency band is used, an antenna having no directivity is mainly used in the wireless communication.

When the antenna having no directivity is used in the wireless communication, the radio signal may sometimes reach, against an intention, an access point outside a target for communication which is located in a communication area of the usual wireless communication device. Thus, in the access point outside the target for communication, a throughput of communication may be sometimes deteriorated due to the arrival of the radio signal from the wireless communication device. Namely, a problem arises that an erroneous communication with the access point outside the target for communication which is not a desired access point generates communication interference between the desired access point and the usual wireless communication device.

In association with this problem, as a method for realizing a wireless communication at high speed as high as Gbps (Giga bit per second), a method is studied to carry out a communication via a radio wave of an extremely short wavelength by using a millimeter wave frequency band. In the millimeter wave frequency band, since a propagation damping of a signal power of a radio signal is larger than that in the microwave frequency band, an antenna having a high directivity in a prescribed direction is ordinarily used. In a below-described explanation, the antenna having the high directivity in the prescribed direction is referred to as a "directional antenna".

However, when the directional antenna is used, if a previously determined directivity of the directional antenna is different from a desired communication direction, the wireless communication device hardly communicates with an access point, through the access point is located in a communicable short range.

Accordingly, in order to limitedly communicate with the access point located in a specific direction, absolute position information of the access point and the wireless communication device needs to be respectively obtained and the wireless communication device needs to calculate the position of the access point in accordance with the absolute position information.

Specifically, the usual wireless communication device and the access point respectively require GPS receivers which measure and transmit the absolute position information. Further, the wireless communication device requires a specific structure for calculating the position of the access point. Accordingly, such a structure is hardly applied to the wireless communication device such as a mobile telephone that requires a miniaturization and a low consumed electric power.

The present invention is devised by considering the above-described usual technique, and it is an object to derive position and direction information of a communication device to be communicated with, which is a target for communication, via a simple configuration by using a millimeter wave frequency band and effectively reduce a communication interference with the desired communication device to be communicated with.

Means for Solving the Problems

The present invention provides a wireless communication device which transmits and receives a signal by a wireless communication using a millimeter wave frequency band, the wireless communication device including an antenna section having a plurality of directivities, an antenna control section which forms the directivity of the plurality of directivities of the antenna section in a prescribed direction, a direction and position estimation section which estimates direction and position information of a wireless communication device to be communicated with, which is a target for the wireless communication, in accordance with a receiving signal received by the antenna section having the directivity formed, and a display section which displays the estimated direction and position information of the wireless communication device to be communicated with.

The present invention provide a wireless communication device which transmits and receives a signal by a wireless communication using a millimeter wave frequency band, the wireless communication device including an antenna section having a directivity in a prescribed direction, a gyro-sensor which detects angle information corresponding to a position change of the wireless communication device, a direction and position estimation section which estimates direction and position information of a wireless communication device to be communicated with, which is a target for the wireless communication, in accordance with a receiving signal received by the antenna section and the angle information, and a display section which displays the estimated direction and position information of the wireless communication device to be communicated with.

The present invention provides a wireless communication method which transmits and receives a signal by a wireless communication using a millimeter wave frequency band through an antenna having directivities in a plurality of different directions, the wireless communication method including a step which forms a directivity of the plurality of directivities of the antenna in a prescribed direction, a step which estimates direction and position information of a wireless communication device to be communicated with, which is a target for the wireless communication, in accordance with a receiving signal received by the antenna having the directivity formed and a step which displays the estimated direction and position information of the wireless communication device to be communicated with.

The present invention provides a wireless communication method which transmits and receives a signal by a wireless communication using a millimeter wave frequency band through an antenna having directivity in a prescribed direction, the wireless communication method including a step which detects angle information corresponding to a position change of the wireless communication device, a step which estimates direction and position information of a wireless communication device to be communicated with, which is a target for the wireless communication of the wireless communication device, in accordance with a receiving signal received by the antenna and the angle information, and a step which displays the estimated direction and position information of the wireless communication device to be communicated with.

Advantageous Effects of the Invention

According to the wireless communication device of the present invention, the relative position and direction information to a communication device to be communicated with, which is a target for communication, can be derived via a simple configuration by using a millimeter wave frequency band and a communication interference with the desired communication device to be communicated with can be effectively reduced.

BRIEF DESCRIPTION OF THE DRAWINGS

FIG. 14 is an explanatory view showing one example of a peripheral access point list.

MODE FOR CARRYING OUT THE INVENTION

Figure 1:
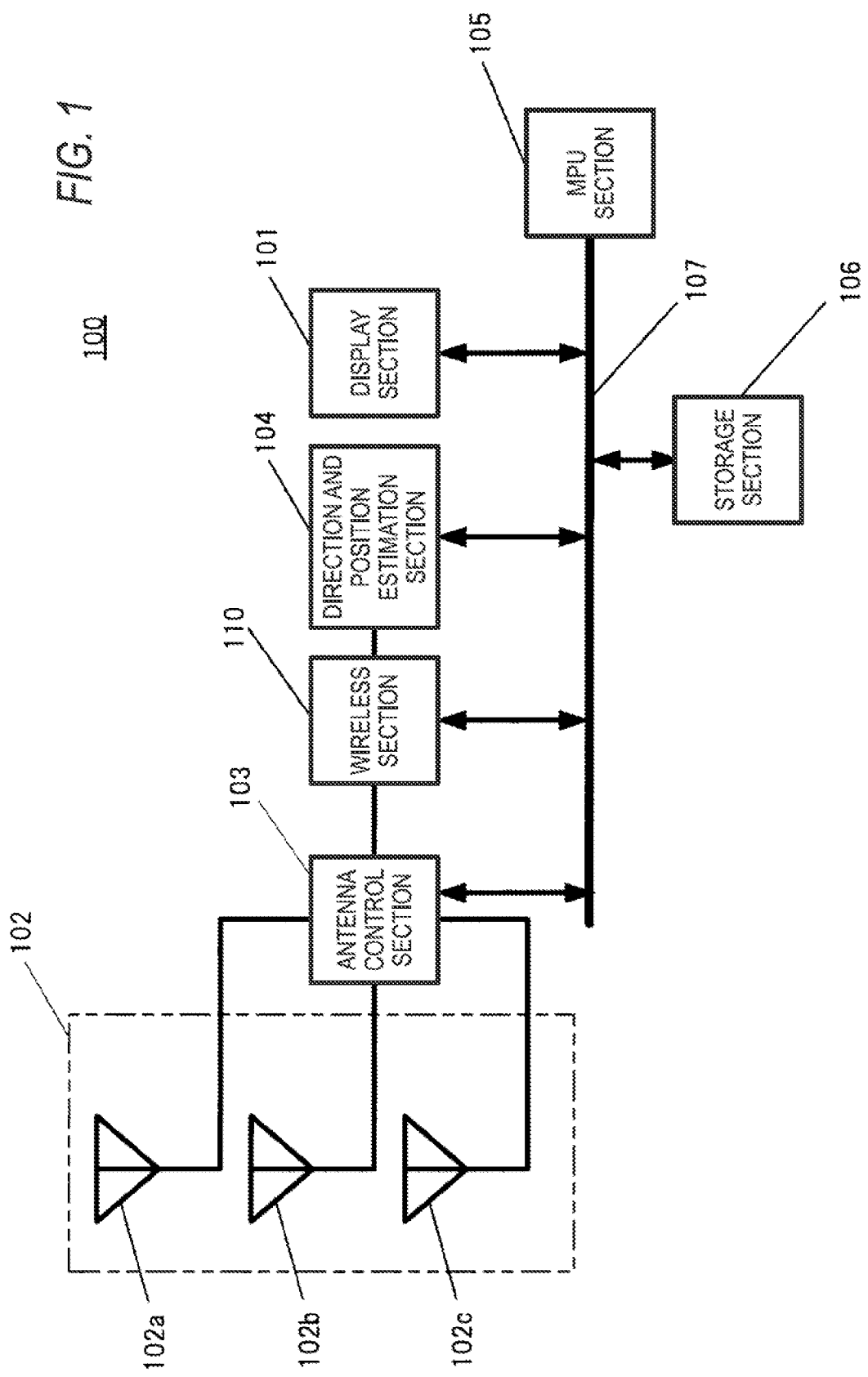
FIG. 1 is a block diagram showing an inner structure of a wireless communication device of a first exemplary embodiment.

Now, an exemplary embodiment of the present invention will be described below by referring to the drawings. In a below-described explanation, as a wireless communication device to be communicated with, which is a target for wireless communication of a wireless communication device of the present invention, for instance, an access point is exemplified which relays a communication of the wireless communication device in a wireless LAN. However, the wireless communication device to be communicated with is not limited to the access point.

Further, in the below-described explanation, position information and direction information of the access point based on the wireless communication device according to the present invention are described as "direction and position information".

Further, in the following description, it is assumed that the wireless communication device according to the present invention can use, as frequency channels capable of transmission and reception, two frequency channels in total including a channel 1 and a channel 2 of a millimeter wave frequency band. Further, it is assumed that the access point as a target for communication of the wireless communication device can use the same frequency channels. In the following explanation, the number of channels is two. However, even when the number of frequency channels is three or more, the same operation is carried out.

First Exemplary Embodiment

A structure of a wireless communication device 100 of a first exemplary embodiment will be described below by referring to FIG. 1 to FIG. 3. FIG. 1 is a block diagram showing an inner structure of the wireless communication device 100 of the first exemplary embodiment.

Figure 2:
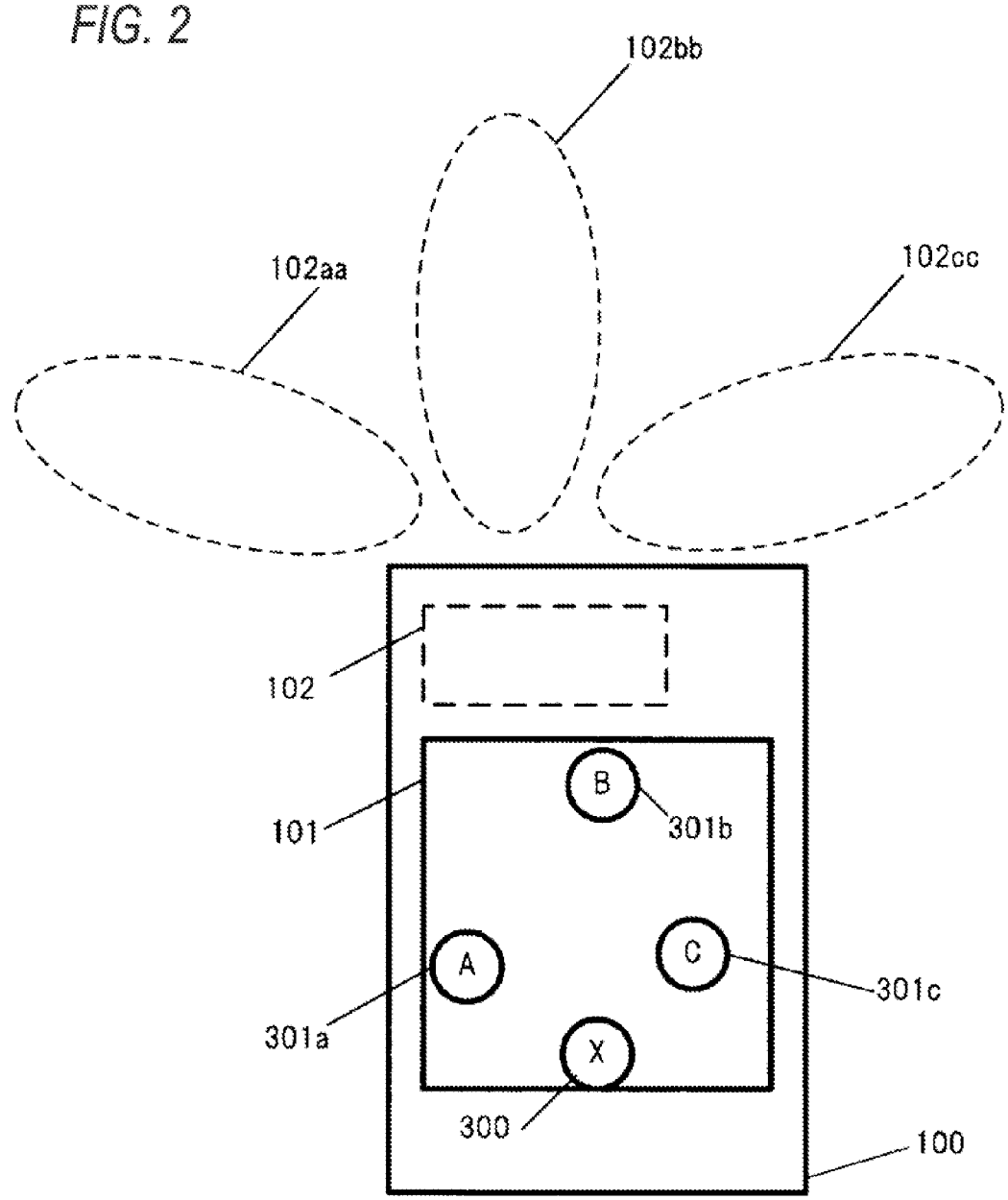
FIG. 2 is an explanatory view showing a schematic external appearance of the wireless communication device of the first exemplary embodiment and a state of a display section which displays relative direction and position information of the wireless communication device and an access point.

FIG. 2 is an explanatory view showing a schematic external appearance of the wireless communication device 100 of the first exemplary embodiment and a state of a display section 101 which displays direction and position information of the wireless communication device 100 and access points 301 to 303.

Figure 3:
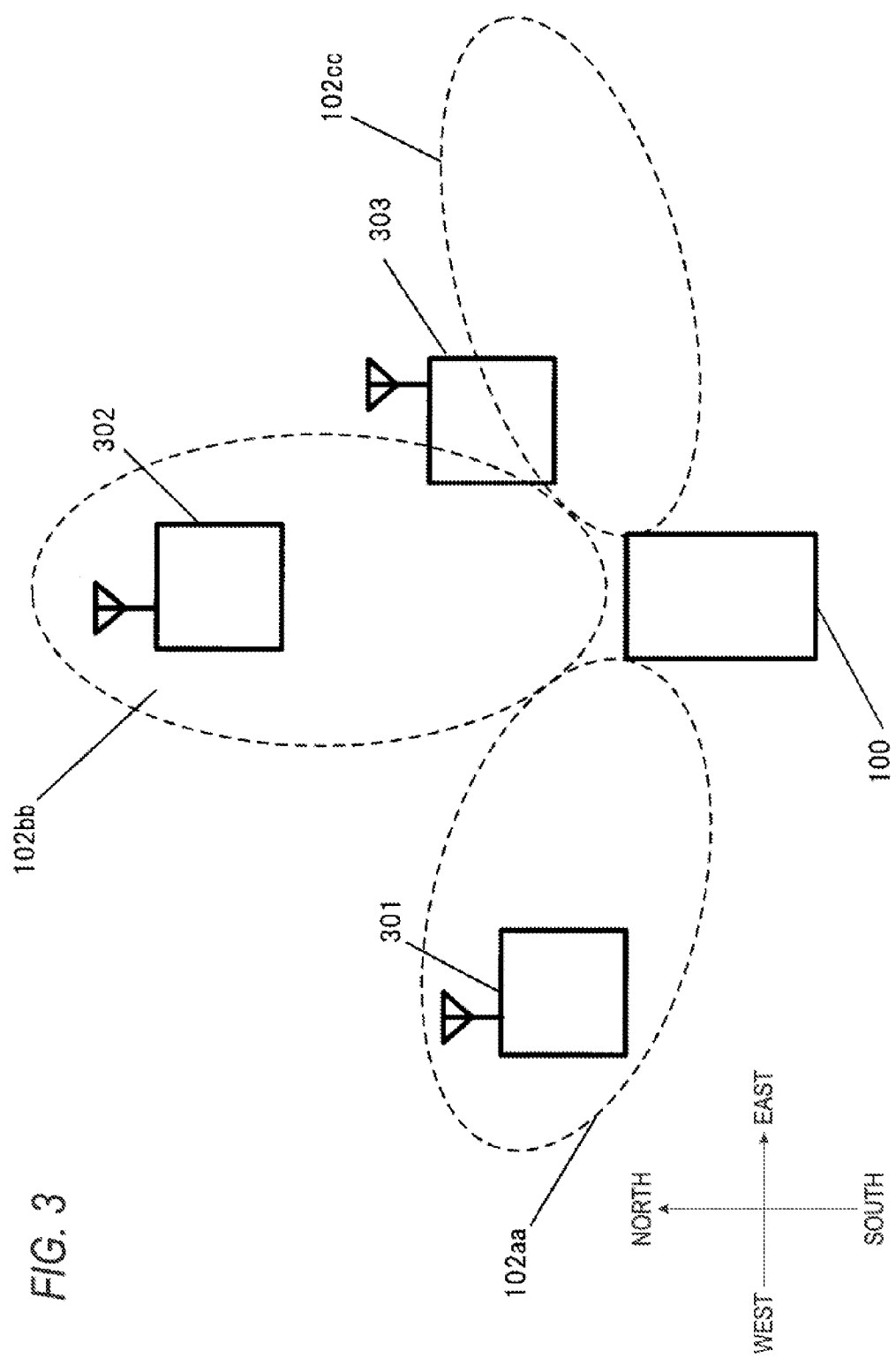
FIG. 3 is an explanatory view showing a positional relation between the wireless communication device of the first exemplary embodiment and the access point located in a communication area of the wireless communication device.

FIG. 3 is an explanatory view showing a positional relation between the wireless communication device 100 of the first exemplary embodiment and the access points 301 to 303 located in communication areas of the wireless communication device 100.

As shown in FIG. 1, in the wireless communication device 100, a display section 101, an antenna control section 103, a wireless section 110, a direction and position estimation section 104, an MPU (Micro Processor Unit) section 105 and a storage section 106 are respectively connected together through a data bus section 107. An antenna section 102 is connected to the antenna control section 103. The wireless section 110 is connected to the antenna control section 103 and the direction and position estimation section 104. The wireless communication device of the present invention is mounted on devices, for instance, a smart phone, a mobile terminal, a mobile telephone, a tablet, a portable game machine, a note PC, etc.

The display section 101 is formed with an LCD (Liquid Crystal Display) or the like. The display section 101 clearly displays in accordance with direction and position information of the access points 301 to 303 derived by the wireless communication device 100. Specifically, as shown in FIG. 2, the display section 101 clearly displays an icon 300 of the wireless communication device 100, and icons 301a, 301b and 301c of the access points 301 to 303.

The antenna section 102 is formed with a plurality of antennas, for instance, three directional antennas 102a, 102b and 102c. As shown in FIG. 2, the directional antennas 102a to 102c are antennas having high and narrow directivities 102aa, 102bb and 102cc respectively in different directions and operated by fed electric power supplied from the antenna control section 103. To the directional antennas 102a to 102c forming the antenna section 102 respectively, numbers which identify the directional antennas are previously designated. In the following description, the numbers for identifying the directional antennas 102a to 102c are respectively referred to as "sector numbers". In the present exemplary embodiment, the sector number of the directional antenna 102a is set to 1 the sector number of the directional antenna 102b is set to 2 and the sector number of the directional antenna 102c is set to 3.

The directional antennas 102a to 102c receive specific information signals transmitted from the access points 301 to 303 respectively located in the communication areas of the directional antennas in the frequency channels capable of transmission and reception of the wireless communication device 100.

The specific information signals are characteristic information signals respectively including identification number information of the access points 301 to 303. In the following description, the specific information signals respectively sent from the access points 301 to 303 are referred to as "beacon signals". The identification number information of the access points 301 to 303 is one example of identification information of the access points 301 to 303 respectively.

For instance, in the beacon signals, the identification number information of the access points 301 to 303 is respectively included. The identification number information includes an MAC address, an SSID (Service Set Identifier) or an ESSID (Extended Service Set Identifier) or the like of each of the access points 301 to 303. An explanation related to the beacon signal is the same respectively in below-described exemplary embodiments.

The antenna control section 103 switches the directional antennas used when the beacon signal is received to select any of the directional antennas 102a to 102c, and further supplies the fed electric power to the selected directional antenna.

The antenna control section 103 temporarily stores the sector number of the selected directional antenna in the storage section 106. The antenna control section 103 forms the directivity of the selected directional antenna as a directivity of the antenna section 102.

Further, the wireless section 110 sets the frequency channel capable of transmission and reception of the wireless communication device 100 to the above-described channel 1 or the channel 2, and detects whether or not the beacon signal is transmitted from the access points 301 to 303 in the channel 1 or the channel 2. The wireless section 110 temporarily stores the set channel 1 or channel 2 in the storage section 106.

The wireless section 110 outputs the beacon signal received by any of the directional antennas selected so as to form the directivity of the antenna section 102 to the direction and position estimation section 104 through the data bus section 107.

The direction and position estimation section 104 inputs the beacon signal outputted by the wireless section 110 through the data bus section 107. The direction and position estimation section 104 derives the direction and position information of the access point which transmits the beacon signal in accordance with the inputted beacon signal.

The direction and position estimation section 104 stores the derived direction and position information of any of the access points 301 to 303 in the storage section 106 through the data bus section 107. A detail of the derivation of the direction and position information will be described below.

The MPU section 105 is formed with an MPU to control operations of the sections of the wireless communication device 100 respectively shown in FIG. 1. For instance, the MPU section 105 displays on the display section 101 icons 300, 301a, 302a, and 303a of the access points respectively in accordance with the direction and position information of the access points 301 to 303 stored in the storage section 106. Data showing functions of the icons 300, 301a, 301b and 301c (see FIG. 2) respectively corresponding to the access points is preferably previously stored in the storage section 106. The data showing the functions includes types of printers, monitors or the like, transmitting speed of data respectively supported by the access points, types of applications or a presence or absence or intensity of a security function or the like.

The storage section 106 includes a hard disk, a flash memory, a ROM (Read Only Memory), a RAM (Random Access Memory) or the like. The storage section 106 stores the direction and position information of the access points 301 to 303 respectively derived by the direction and position estimation section 104.

Further, the storage section 106 functions as a work memory when the sections of the wireless communication device 100 respectively operate.

As shown in FIG. 3, the access points 301 to 303 respectively operate as independent access points. The access points 301 to 303 periodically transmit the beacon signals respectively including the identification number information of the access points by using the different frequency channels (the channel 1 or the channel 2) in the millimeter wave frequency band. An explanation of the access points 301 to 303 is the same in below-described exemplary embodiments.

FIG. 3 shows that the access point 301 is detected in the communication area formed by the directivity 102aa of the directional antenna 102a. Similarly, FIG. 3 shows that the access point 302 is detected in the communication area formed by the directivity 102bb of the directional antenna 102b. Similarly, FIG. 3 shows that the access point 303 is detected in an intermediate spot of the communication areas respectively formed by the directivity 102bb of the directional antenna 102b and the directivity 102cc of the directional antenna 102c.

Figure 4:
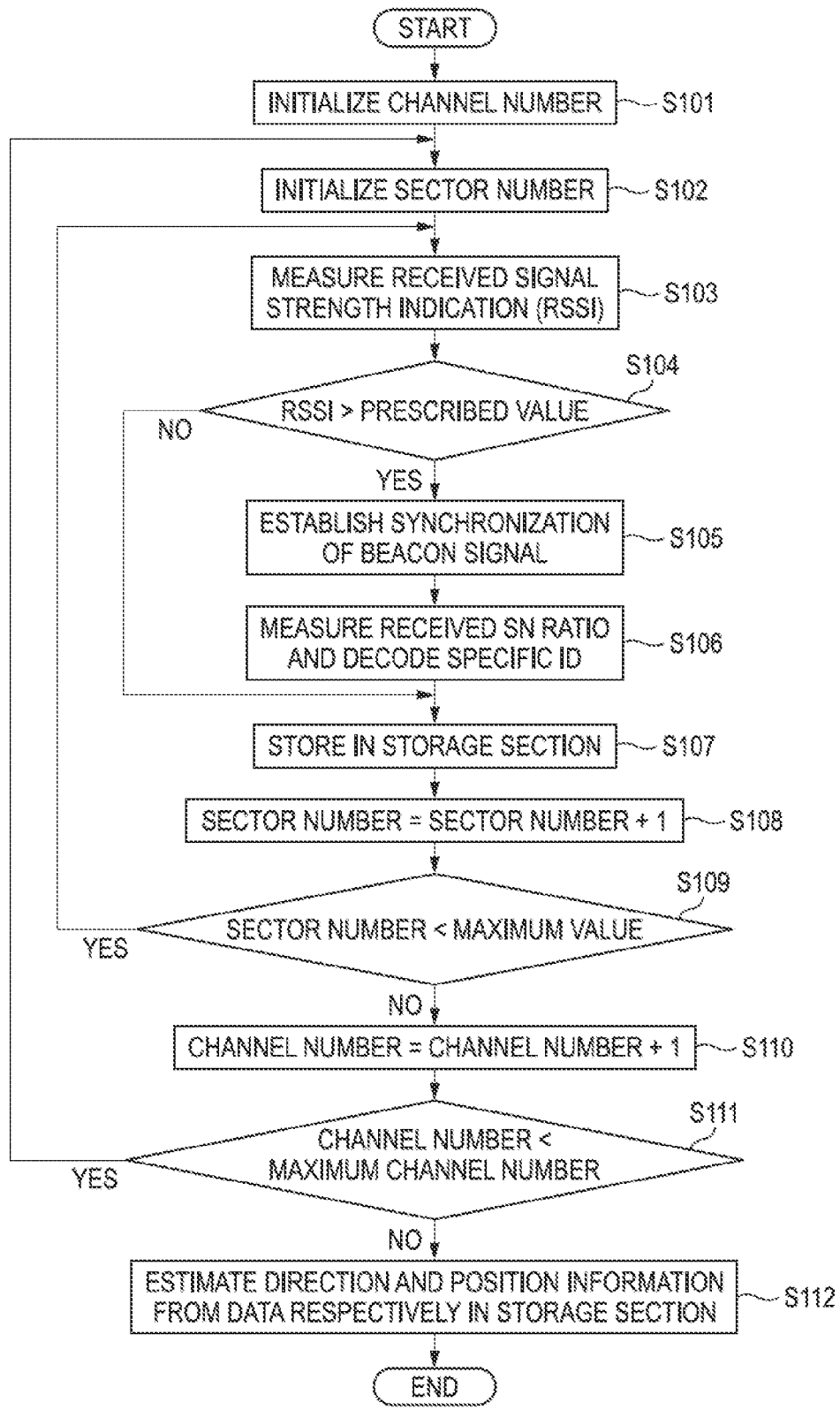
FIG. 4 is a flowchart for explaining an operation of the wireless communication device of the first exemplary embodiment.

Now, an operation of the wireless communication device 100 will be described by referring to FIG. 4. FIG. 4 is a flowchart for explaining the operation of the wireless communication device 100 of the first exemplary embodiment.

In FIG. 4, the wireless section 110 initializes the number of the frequency channel in the millimeter wave frequency band (S101). Namely, the wireless section 110 sets the frequency channel in the millimeter wave frequency band capable of transmission and reception of the wireless communication device 100 to the channel 1. Information that the frequency channel is set to the channel 1 is stored in the storage section 106.

The antenna control section 103 initializes the sector numbers of the directional antennas 102a to 102c to 1 (S102). Namely, the antenna control section 103 initially selects the directional antenna 102a of the directional antennas 102a to 102c of the antenna section 120 as the directional antenna for forming the directivity of the antenna section 102.

Thus, in the antenna section 102 of the wireless communication device 100, as shown in FIG. 3, the directivity 102aa of the directional antenna 102a is formed. The wireless communication device 100 detects whether or not the access point which is a target for communication of the wireless communication 100 is located in the communication area (not shown in the drawing) of the formed directivity 102aa of the directional antenna 102a.

The wireless section 110 measures a received electric field intensity (RSSI: Received Signal Strength Indication) existing in the channel 1 in the millimeter wave frequency band (S103). When the measured received signal strength indication exceeds a prescribed value (S104, YES), the wireless section 110 moves to an operation for establishing a synchronization of the beacon signal (S105) to detect a preamble of the beacon signal and establishes the synchronization of the beacon signal (S105). After the wireless section 110 establishes the synchronization of the beacon signal, the wireless section 110 receives the beacon signal and outputs the beacon signal to the direction and position estimation section 104. On the other hand, when the measured received signal strength indication is lower than the prescribed value (S104, NO), the wireless section 110 advances to step S107 to store only information of the received signal strength indication in the storage section 106.

The direction and position estimation section 104 inputs the beacon signal outputted by the wireless section 110. The direction and position estimation section 104 demodulates a data area of the beacon signal in accordance with information of a header area of the inputted beacon signal. The direction and position estimation section 104 derives the received signal strength indication and a received SN ratio of the beacon signal in accordance with data of the demodulated data area (S106). Further, the direction and position estimation section 104 extracts the identification number information of the access point included in the header area of the beacon signal. In the identification number information, the MAC addresses, the SSID or the ESSID or the like of the access points 301 to 303 are respectively included.

The direction and position estimation section 104 coordinates the extracted identification number information of the access points with information of the received signal strength indication and the received SN ratio of the beacon signal derived in the step S106 and stores the information in the storage section 106 (S107).

Then, the antenna control section 103 adds 1 to the present sector numbers (=1) of the directional antennas 102a to 102c of the antenna section 102 to set the sector numbers to 2 (S108). Namely, the antenna control section 103 selects the directional antenna 102b having the sector number of 2 among the directional antennas 102a to 102c of the antenna section 102 as the directional antenna for forming the directivity of the antenna section 102.

Then, the wireless communication device 100 decides whether or not the present sector number exceeds a maximum value of the sector numbers in the antenna section 102 (S109). Namely, the wireless communication device 100 repeats the above-described operations from the step S103 to the step 108 in all the frequency channels capable of transmission and reception. That is, the wireless communication device 100 forms respectively the directivities 102aa to 102cc of the directional antennas 102a to 102c in the channel 1 of the millimeter wave frequency band and detects whether or not the access points are located in the communication areas of the formed directivities.

When the present sector number exceeds the maximum value of the sector numbers in the antenna section 102 (S109, NO), the wireless section 110 changes the frequency channel now set in the millimeter wave frequency band from the channel 1 to the channel 2 (S110). After that, the wireless communication device 100 repeats the above-described operations of the step S102 to the step S109 (S111). For instance, when the frequency channel set at present is not 2 which is a maximum channel number (S111, YES), the wireless communication device 100 sets the frequency channel in the millimeter wave frequency band to the channel 2. Further, the wireless communication device 100 forms respectively the directivities 102aa to 102cc of the directional antennas 102a to 102c of the antenna section 102 in the channel 2 and detects whether or not the access points are located in the communication areas of the formed directivities.

As mentioned above, information which is shown below is coordinated with the frequency channel and the sector number of any directional antenna of the directional antennas 102a to 102c and stored in the storage section 106. The information coordinated with the frequency channel and the sector number of the directional antenna includes the received signal strength indication and the received SN ratio of the beacon signal received by the directional antenna and the identification number information of the access point.

The direction and position estimation section 104 derives the direction and position information of the access points 301 to 303 respectively in accordance with the data stored in the storage section 106, specifically, the received SN ratio.

Antenna gains of the access points 301 to 303 and a signal electric power of the beacon signals are supposed to be included in the beacon signals transmitted from the access points 301 to 303.

The received SN ratio is determined by using the received beacon signals, and the signal electric power of the beacon signals respectively transmitted by the access points 301 to 303, the antenna gains of the access points 301 to 303 and gains and noise factors of the directional antennas 102a to 102c.

Accordingly, when the antenna gains of the access points 301 to 301 and the signal electric power of the beacon signals are understood, the direction and position estimation section 104 can derive a propagated distance from the received SN ratio derived in the step S106.

The direction and position estimation section 104 derives the direction and position information of the wireless communication device 100 and the access points 301 to 303 respectively in accordance with the above-described received SN ratio stored in the storage section 106 (S112).

The direction information of the direction and position information of the access points 301 to 303 respectively based on the wireless communication device 100 is determined on the basis of the directivity of the antenna section 102 when the antenna section receives the beacon signals sent from the access points 301 to 303.

For instance, when the directivity 102aa of the antenna section 102 is formed, if the beacon signal is received from the access point 301, the direction information of the access point 301 is expressed substantially as a northwest side as shown in FIG. 3. In FIG. 3, for the purpose of explanation, the direction of the access point 301 is expressed as a northwest by expressing an upper direction of the drawing as a north, a left direction as a west and a right direction as an east. The direction information of other access points 302 and 303 are similarly expressed even when the beacon signals are respectively received.

Further, distance information of the wireless communication device 100 and the access points 301 to 303 of the direction and position information is determined as an estimated value based on the propagated distance of the beacon signal derived in accordance with the received SN ratio in the step S112.

Further, as shown in FIG. 3, the access point 303 detected in the intermediate spot of the communication area where the directivity 102bb is formed and the communication area where the directivity 102cc is formed derives the direction and position information of the access point 303 in such a way as described below.

Specifically, the direction and position estimation section 104 respectively derives the direction and position information of the access point when the directivity 102bb is formed and the direction and position information of the access point when the directivity 102cc is formed. Further, the direction and position estimation section 104 derives an intersecting point of a direction (an angle) and a position (a distance)

respectively included in the derived direction and position information to derive the direction and position information of the access point 303.

The direction and position estimation section 104 stores the derived direction and position information of the access point 303 in the storage section 106. The MPU section 105 clearly displays, as shown in FIG. 2, the direction and position information of the access points stored in the storage section 106 on the display section 101. As the direction and position information of the access points, the MPU section 105 displays the identification number information, for instance, the ESSID on the display section 101. Thus, the wireless communication device 100 can easily urge a user to select the access point which can be connected to the wireless communication device 100.

Now, one available example of the access points 301 to 303 will be described below. For instance, the access point 301 is supposed to be a television having a large screen and the access point 302 is supposed to be a PC (Personal Computer). Further, the access point 303 is supposed to be a storage device such as an HOD (Hard disk Drive) recorder. The wireless communication device 100 sequentially forms the directivities respectively for the directional antennas 102a to 102c by using the directional antennas 102a to 102c having the high and narrow directivities in the frequency channel of the millimeter wave frequency band to detect whether or not the access points exist.

Thus, the wireless communication device 100 is supposed to send a file from the wireless communication device 100 to the storage device which is the access point 303 of the access points 301 to 303 respectively having the direction and position information derived. Even under this state, the wireless communication device 100 can suppress the leakage of a radio wave to the television or a transmitting signal to the PC. Accordingly, in the present exemplary embodiment, for instance, a communication between the wireless communication device 100 and the storage device can be established, and a communication between the PC and the television can be established at the same time.

Accordingly, the wireless communication device 100 of the first exemplary embodiment can derive the relative position and direction information to the access points 301 to 303 which are targets for communication via a simple configuration by using a millimeter wave frequency band. Further, since the wireless communication device 100 can simply realize a communication with the desired access points 301 to 303, a communication interference with the desired access points 301 to 303 can be effectively reduced.

On the above-described display section 101, as the icons of the access points 301 to 303 respectively, the identification number information of the access points, for instance, the ESSID is preferably displayed. However, the icons of the access points 301 to 303 are not limited to the identification number information. For instance, the display section 101 may display image data of the television, the PC, a printer or the like as icons. In this case, these image data is supposed to be previously stored in the storage section 106 of the wireless communication device 100.

In the wireless communication device 100 of the first exemplary embodiment, a touch panel may be arranged on the display section 101. This may be applied to below-described exemplary embodiments in the same manner. In this case, in an input operation of the touch panel, after the user properly recognizes the position and direction of the desired access point as a target to be communicated with, the user can properly select the directional antenna which forms the directivity in the direction of the desired access point.

Thus, in the wireless communication device 100, the user can instantaneously form the directivity in the direction of the desired access point, and further, a time for establishing a communication can be more shortened. Further, since the wireless communication device 100 can more shorten the time for establishing the communication with the access point, secrecy of communication can be improved.

Further, since the directional antenna having the narrow directivity which meets the millimeter wave frequency band ordinarily has a high antenna gain. Therefore, the use of the directional antenna having the narrow directivity which meets the millimeter wave frequency band can improve a line quality. Accordingly, the wireless communication device 100 forms the directivities $102aa$ to $102cc$ of the directional antennas $102a$ to $102c$ in more suitable directions, so that the wireless communication device can easily realize a high-speed wireless communication of the giga bit class.

Second Exemplary Embodiment

Figure 5:
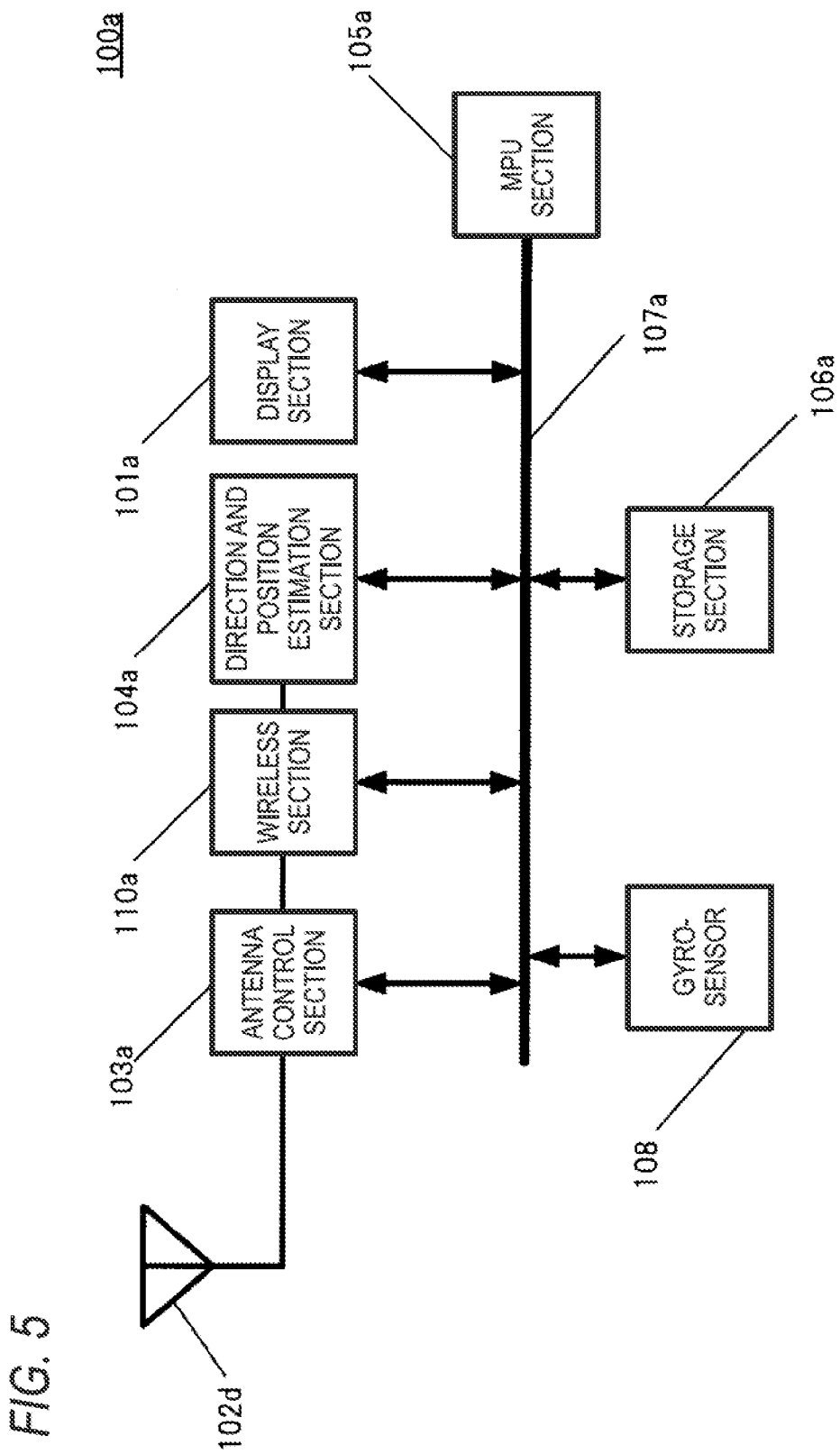
FIG. 5 is a block diagram showing an inner structure of a wireless communication device of a second exemplary embodiment.

A structure of a wireless communication device 100a of a second exemplary embodiment will be described by referring to FIG. 5 to FIG. 7. In an explanation of structures and operations of the wireless communication device 100a of the second exemplary embodiment, a description of the same structures and operations as those of the wireless communication device 100 of the first exemplary embodiment will be omitted. FIG. 5 is a block diagram showing an inner structure of the wireless communication device 100a of the second exemplary embodiment.

Figure 6:
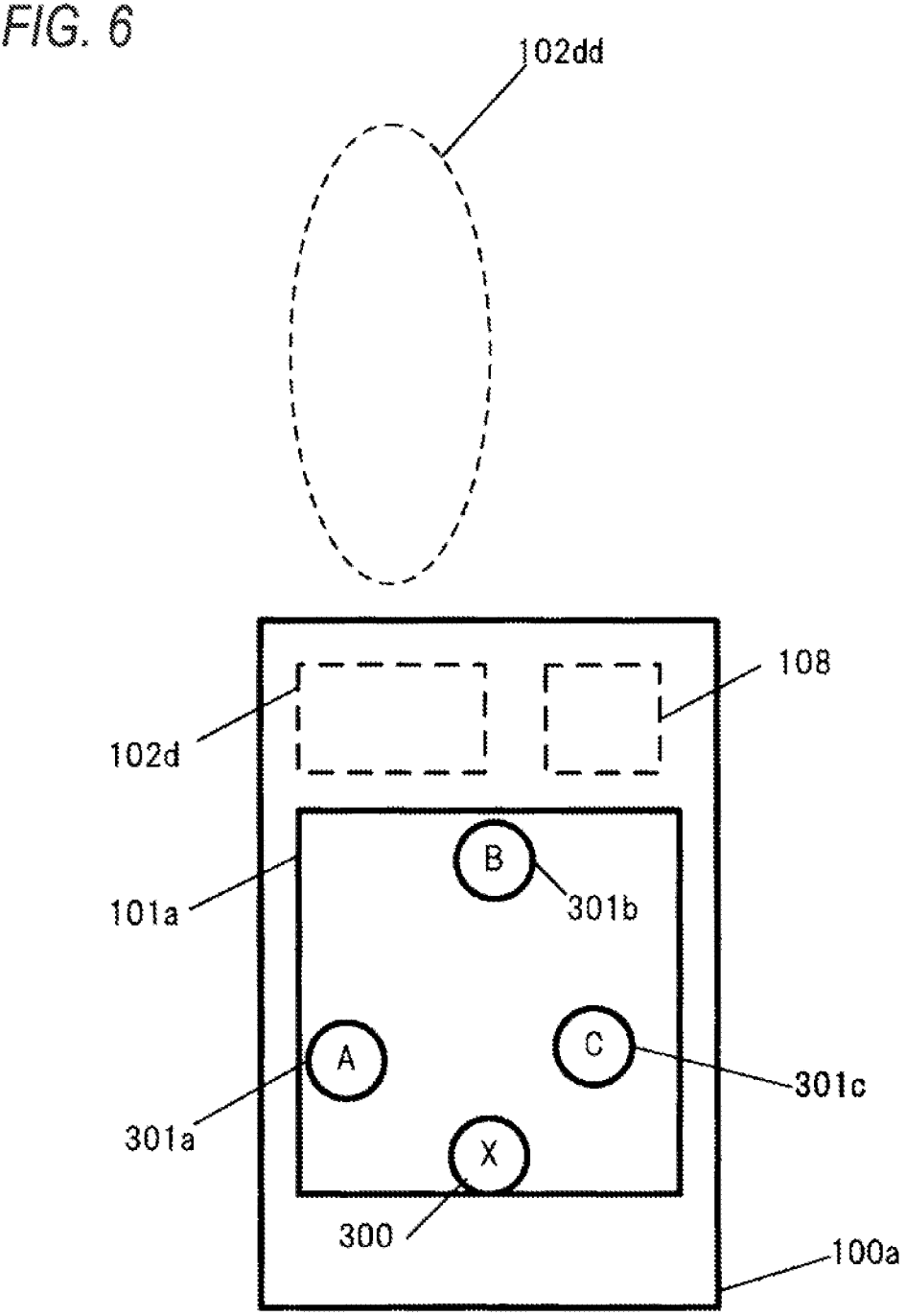
FIG. 6 is an explanatory view showing a schematic external appearance of the wireless communication device of the second exemplary embodiment and a state of a display section which displays relative direction and position information of the wireless communication device and an access point.

FIG. 6 is an explanatory view showing a schematic external appearance of the wireless communication device of the second exemplary embodiment and a state of a display section 101a which displays direction and position information of the wireless communication device 100a and access points 301 to 303.

Figure 7:
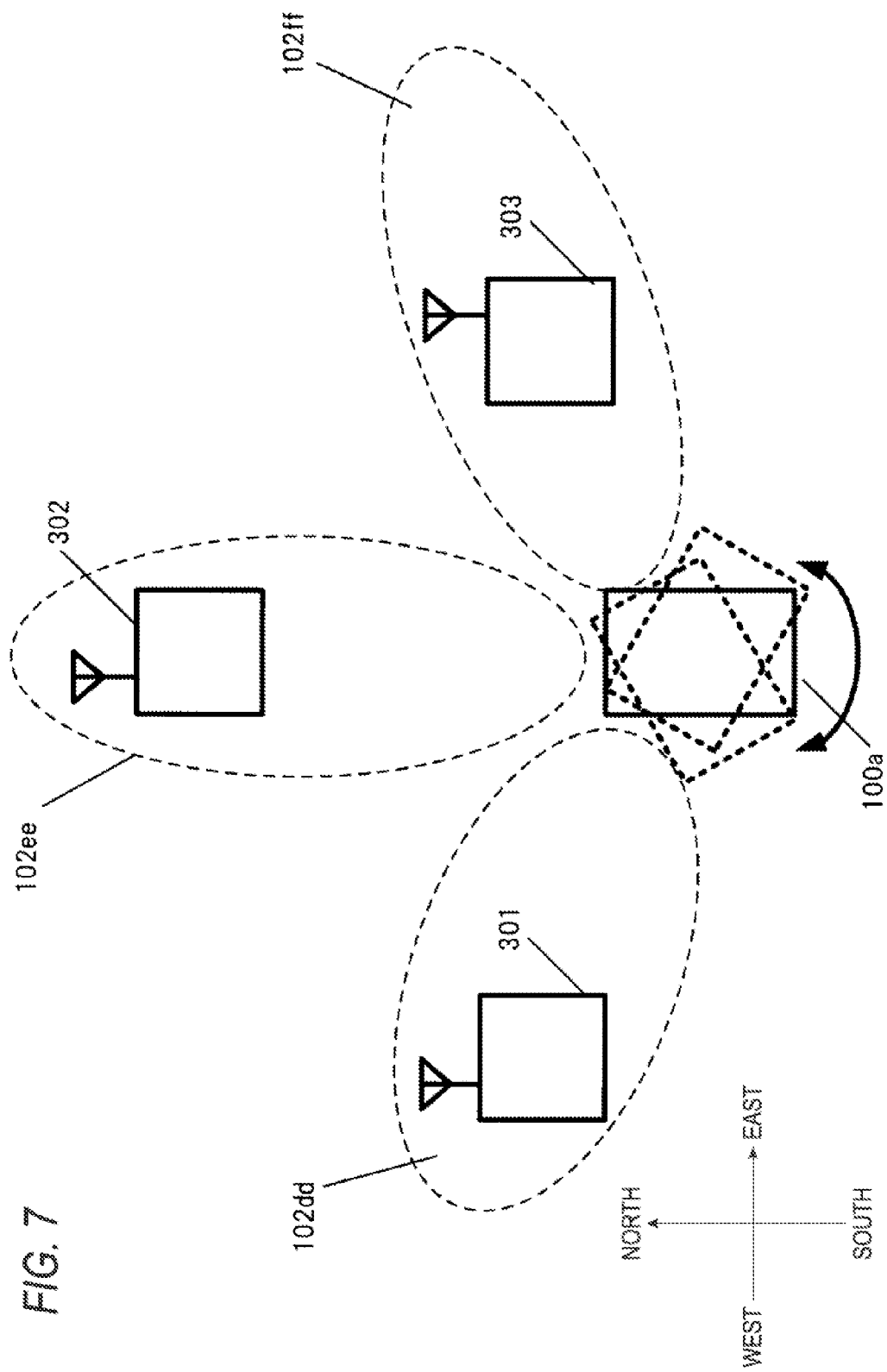
FIG. 7 is an explanatory view showing a positional relation between the wireless communication device of the second exemplary embodiment and the access point located in a communication area of the wireless communication device.

FIG. 7 is an explanatory view showing a positional relation between the wireless communication device 100a of the second exemplary embodiment and the access point 301 to 303 located in communication areas of the wireless communication device 100a.

As shown in FIG. 5, in the wireless communication device 100a, a display section 101a, an antenna control section 103a, a wireless section 110a, a direction and position estimation section 104a, an MPU section 105a, a storage section 106a and a gyro-sensor 108 are respectively connected together through a data bus section 107a. A directional antenna 102d is connected to the wireless section 110a.

As shown in FIG. 6, the directional antenna 102d is an antenna having a high and narrow directivity $102dd$ in a previously securely determined direction and operated by fed electric power supplied from the antenna control section 103a. The directional antenna 102d receives a beacon signal transmitted from an access point located in a communication area of the directional antenna 102d in a frequency channel capable of transmission and reception of the wireless communication device 100a.

The antenna control section 103a supplies the fed electric power to the directional antenna 102d to form the directivity $102dd$ in the directional antenna 102d.

The wireless section 110a sets the frequency channel capable of transmission and reception of the wireless communication device 100a to a channel 1 or a channel 2, and detects whether or not the beacon signal is transmitted from the access points 301 to 303 in the channel 1 or the channel 2. The wireless section 110a outputs the beacon signal received by the directional antenna 102d to the direction and position estimation section 104a through the data bus section 107a The wireless section 110a temporarily stores set contents of the set channel 1 or channel 2 in the storage section 106a. The number of channels may be three or more.

Since operations of the direction and position estimation section 104a, the MPU section 105a and the storage section 106a are the same as the operations of the direction and position estimation section 104, the MPU section 105 and the storage section 106 of the above-described first exemplary embodiment, an explanation of the operations will be omitted.

The gyro-sensor 108 detects angle information corresponding to a holding state of a user who holds the wireless communication device 100a. The gyro-sensor 108 outputs the detected angle information respectively to the direction and position estimation section 104a and the storage section 106a through the data bus section 107a.

FIG. 7 shows that the access point 301 is detected in the communication area where the directivity 102dd of the directional antenna 102d is formed in accordance with the angle information corresponding to the held state of the wireless communication device 100a by the user.

Similarly, FIG. 7 shows that the access point 302 is detected in the communication area where the directivity 102ee of the directional antenna 102d is formed in accordance with the angle information corresponding to the held state of the wireless communication device 100a by the user.

Similarly, FIG. 7 shows that the access point 303 is detected in the communication area where the directivity 102ff of the directional antenna 102d is formed in accordance with the angle information corresponding to the held state of the wireless communication device 100a by the user.

Figure 8:
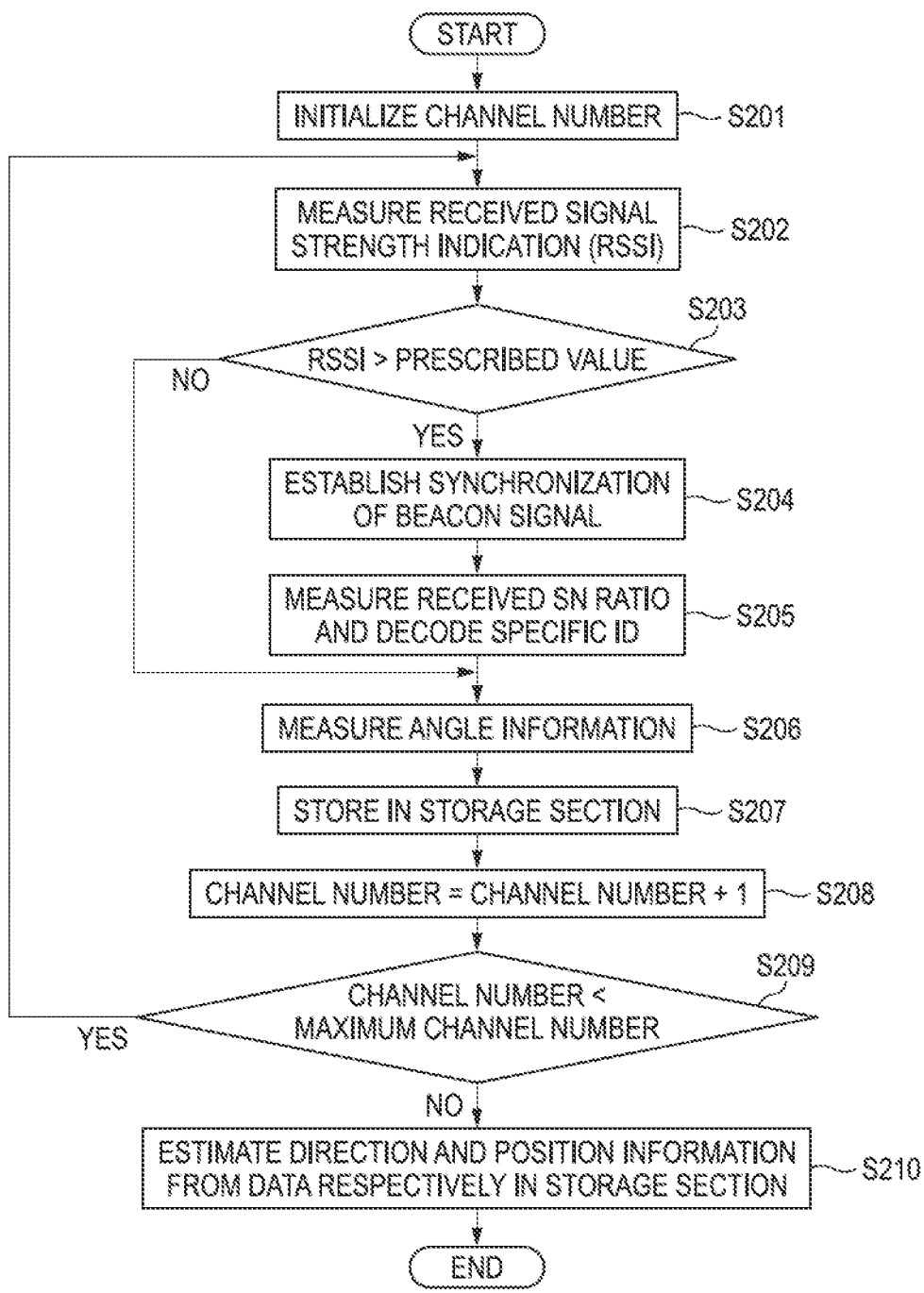
FIG. 8 is a flowchart for explaining an operation of the wireless communication device of the second exemplary embodiment.

Now, an operation of the wireless communication device 100a will be described by referring to FIG. 8. FIG. 8 is a flowchart for explaining the operation of the wireless communication device 100a of the second exemplary embodiment.

In FIG. 8, the wireless section 110a initializes the number of the frequency channel in a millimeter wave frequency band (S201). Namely, the wireless section 110a sets the frequency channel in the millimeter wave frequency band capable of transmission and reception of the wireless communication device 100a to the channel 1. Information that the frequency channel is set to the channel 1 is stored in the storage section 106a.

The wireless section 110a measures a received signal strength indication located in the channel 1 in the millimeter wave frequency band (S202). When the measured received signal strength indication exceeds a prescribed value (S203, YES), the wireless section 110a moves to an operation for establishing a synchronization of the beacon signal (S204) to detect a preamble of the beacon signal and establishes the synchronization of the beacon signal (S204). After the wireless section 110a establishes the synchronization of the beacon signal, the wireless section 110a receives the beacon signal and outputs the beacon signal to the direction and position estimation section 104a. On the other hand, when the measured received signal strength indication is lower than the prescribed value (S203, NO), the wireless section 110a advances to step S207 to store the angle information and information of the received signal strength indication in the storage section 106a.

The direction and position estimation section 104a inputs the beacon signal outputted by the wireless section 110a. The direction and position estimation section 104a demodulates a data area of the beacon signal in accordance with information of a header area of the inputted beacon signal. The direction and position estimation section 104a derives the received signal strength indication and a received SN ratio of the beacon signal in accordance with data of the demodulated data area (S205). Further, the direction and position estimation section 104a extracts identification number information of the access point included in the header area of the beacon signal. In the identification number information, MAC addresses, an SSID or an ESSID or the like of the access points 301 to 303 are respectively included.

At this time, the gyro-sensor 108 detects the angle information corresponding to the holding state of the user who holds the wireless communication device 100a (S206). Then, the gyro-sensor 108 outputs the detected angle information respectively to the direction and position estimation section 104a and the storage section 106a through the data bus section 107a.

The direction and position estimation section 104a coordinates the extracted identification number information of the access points with the information of the received signal strength indication and the received SN ratio of the beacon signal derived in the step S205 and stores the information in the storage section 106a (S207).

Then, the wireless section 110a changes the frequency channel now set in the millimeter wave frequency band from the channel 1 to the channel 2 (S208). After that, the wireless communication device 100a repeats the above-described operations of the step S202 to the step S207 in all the frequency channels capable of transmission and reception (S209). For instance, when the frequency channel set at present is not the channel 2 which is a maximum channel number (S209, YES), the wireless communication device 100a sets the frequency channel in the millimeter wave frequency band to the channel 2. Further, the wireless communication device 100a detects the access points respectively located in the communication areas of the directivities 102dd to 102ff of the directional antenna 102d which are formed correspondingly to the angle information detected by the gyro-sensor 108 in the channel 2.

As mentioned above, in the storage section 106a, data of the received signal strength indication and the received SN ratio of the beacon signal received by the directional antenna 102d and the identification number information of the access points is respectively stored correspondingly to the frequency channels and the directional antenna 102d.

The direction and position estimation section 104a derives direction and position information of the access points 301 to 303 respectively in accordance with the data stored in the storage section 106a, specifically, the received SN ratio (S210).

Directions of the access points 301 to 303 of the direction and position information are respectively determined in accordance with a direction of the wireless communication device 100a to which the directivities of the directional antenna 102d receiving the beacon signals transmitted from the access points 301 to 303 are directed. The directions of the access points 301 to 303 are respectively based on the wireless communication device 100a.

The directivity of the directional antenna 102d depends on the angle information detected by the gyro-sensor 108. For instance, when the beacon signal is received from the access point 301, direction information of the access point 301 is set to the angle information detected by the gyro-sensor 108 when the directivity 102dd is formed as shown in FIG. 7. Direction information of other access points 302 and 303 is similarly set even when the beacon signals are respectively received.

Further, distance information (position information) of the wireless communication device 100a and the access points 301 to 303 in the direction and position information is determined in accordance with a propagated distance of the beacon signal derived in accordance with the received SN ratio in the step S210.

Accordingly, the wireless communication device 100a of the second exemplary embodiment can derive the position and direction information to the access points 301 to 303 which are targets for communication via a simple configuration by using the millimeter wave frequency band like the above-described wireless communication device 100. Further, since the wireless communication device 100a can simply realize a communication with the desired access points 301 to 303, a communication interference with the desired access points 301 to 303 can be effectively reduced.

On the display section 101a of the wireless communication device 100a, as icons of the access points 301 to 303, the identification number information of the access points 301 to 303 respectively, for instance, an ISSID is displayed as in the first exemplary embodiment. Accordingly, when the wireless communication device communicates with the access point with the displayed icon, the user holds the wireless communication device 100a so as to be inclined to a direction of the access point. Thus, the wireless communication device 100a can simply realize a communication with the access point.

As explained in the above-described second exemplary embodiment, the directional antenna 102d is used which has the high and narrow directivity in the previously securely determined direction. However, in the wireless communication device 100a of the second exemplary embodiment, the directional antennas 102a to 102c which can switch the directivity forming the antenna section 102 described in the first exemplary embodiment may be used in place of the directional antenna 102d.

In this case, directional antennas 102a' to 102c' having narrower communication areas are used so that directivities set in the directional antennas 102a and 102c may be more finely divided so as to switch the communication area set by the directional antenna 102d.

When the user inclines the wireless communication device 100a to form the directivity, the wireless communication device 100a can highly accurately estimate the direction and position information of the access points.

Third Exemplary Embodiment

Figure 9:
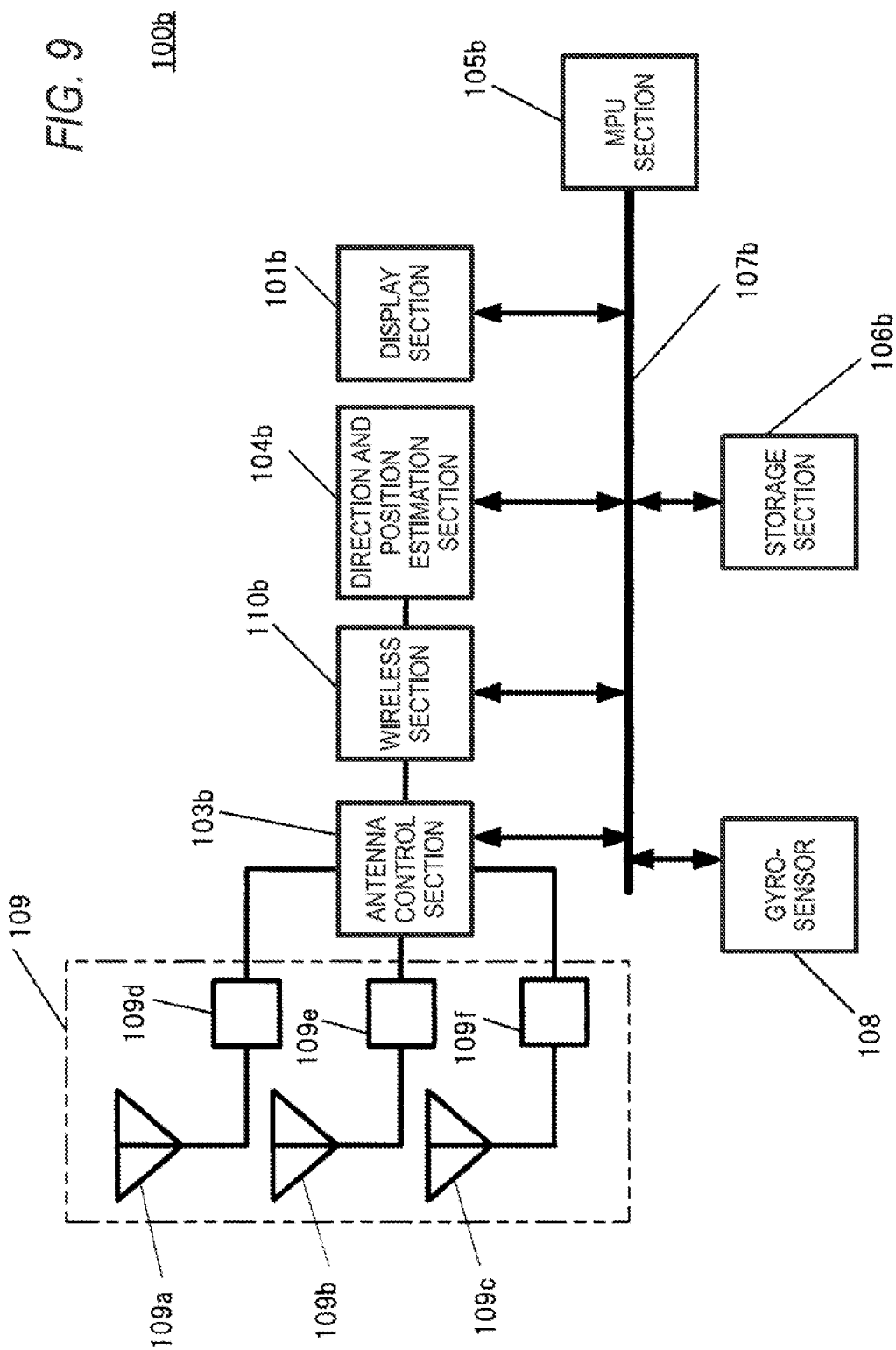
FIG. 9 is a block diagram showing an inner structure of a wireless communication device of a third exemplary embodiment.

A structure of a wireless communication device 100b of a third exemplary embodiment will be described by referring to FIG. 9 and FIG. 10. In an explanation of structures and operations of the wireless communication device 100b of the third exemplary embodiment, a description of the same structures and operations as those of the wireless communication device 100 of the first exemplary embodiment or the wireless communication device 100a of the second exemplary embodiment will be omitted. FIG. 9 is a block diagram showing an inner structure of the wireless communication device 100b of the third exemplary embodiment.

Figure 10:
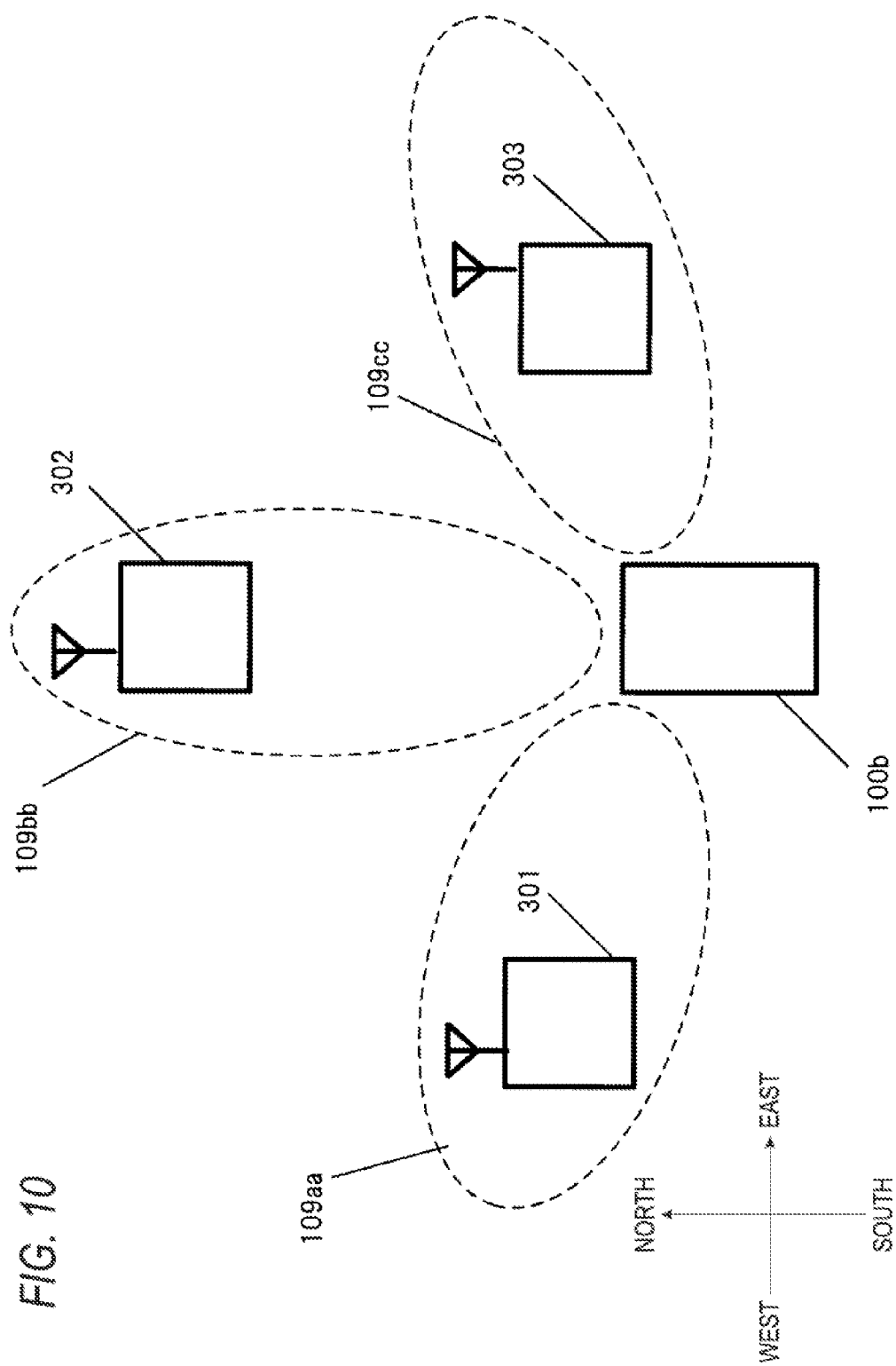
FIG. 10 is an explanatory view showing a positional relation between the wireless communication device of the third exemplary embodiment and an access point located in a communication area of the wireless communication device.

FIG. 10 is an explanatory view showing a schematic external appearance of the wireless communication device 100b of the third exemplary embodiment and a state of a display section 101b which displays direction and position information of the wireless communication device 100b and access points 301 to 303.

As shown in FIG. 9, in the wireless communication device 100b, a display section 101b, an antenna control section 103b, a wireless section 110b, a direction and position estimation section 104b, an MPU section 105b, a storage section 106b and a gyro-sensor 108 are respectively connected together through a data bus section 107b. The gyro-sensor 108 may be omitted in the wireless communication device 100b. An antenna section 109 is connected to the antenna control section 103b. The wireless section 110b is connected to the antenna control section 103b and the direction and position estimation section 104b.

As shown in FIG. 9, the antenna section 109 is phased array antennas formed with a plurality of antennas, for instance, three antennas 109a, 109b and 109c and phase adjustment sections 109d, 109e and 109f respectively connected to the antennas 109a to 109c.

In the antenna section 109, the phase adjustment sections 109d to 109f respectively formed with phase converters adjust phases of transmitting signals transmitted from the antennas 109a to 109c to provide prescribed phase differences between the signals. Thus, directivities are formed in prescribed directions. The antenna section 109 is operated by fed electric power supplied from the antenna control section 103b.

The antennas 109a to 109c respectively receive beacon signals transmitted from access points 301 to 303 respectively located in communication areas of the antennas 109a to 109c in frequency channels capable of transmission and reception of the wireless communication device 100b.

The antenna control section 103b supplies the fed electric power to the antenna section 109 to control the directivities of the phased array antennas of the supplied antenna section 109. The antenna control section 103b is connected to the wireless section 110b.

The wireless section 110 sets the frequency channel capable of transmission and reception of the wireless communication device 100b to a channel 1 or a channel 2, and detects whether or not the beacon signals are transmitted from the access points 301 to 303 in the channel 1 or the channel 2. The wireless section 110b temporarily stores the setting contents of the set channel 1 or channel 2 in the storage section 106.

The wireless section 110b outputs the beacon signal received by the antenna section 109 to the direction and position estimation section 104b through the data bus section 107b.

The direction and position estimation section 104b inputs the beacon signal outputted by the wireless section 110b through the data bus section 107b. The direction and position estimation section 104b derives direction and position information of the access point which transmits the beacon signal from directivity pattern information of the phased array antennas and a signal strength or intensity and phase information of the beacon signal respectively in directivity patterns.

Especially when a direction of the direction and position information of the access points 301 to 303 which transmits the beacon signal is estimated, the direction and position estimation section 104b can derive the direction by estimating an arrival direction and distance using a known MUSIC method.

The MUSIC method (Multiple Signal Classification) method is an algorithm that measures directions of a plurality of radio waves arriving at the same time at the plurality of antennas such as the phased array antennas. Specifically, in the MUSIC method, are initially derived characteristic values of a correlation matrix obtained from receiving signals received by the plurality of antennas. The derived characteristic values are divided into signal characteristic values and noise characteristic values depending on wave numbers of the beacon signals transmitted from the access points and a noise characteristic vector corresponding to the noise characteristic value is derived. Then, in the MUSIC method, an angle spectrum is derived in accordance with the noise characteristic vector. A parallel average of the derived angle spectrum is carried out to derive an MUSIC spectrum. Then, in the MUSIC method, a desired arrival direction of the beacon signal is estimated from the derived MUSIC spectrum.

The direction and position estimation section 104b stores the derived direction and position information of any of the access points 301 to 303 in the storage section 106b through the data bus section 107b. A detail of the derivation of a position (a distance) of the direction and position information will be described below.

Since operations of the MPU section 105b, the storage section 106b and the gyro-sensor 108 are the same as the operations of the MPU section 105a, the storage section 106a and the gyro-sensor 108 of the above-described second exemplary embodiment, an explanation of the operations will be omitted.

FIG. 10 shows that the access point 301 is detected in the communication area where directivity 109aa of the phased array antennas of the antenna section 109 is formed.

Similarly, FIG. 10 shows that the access point 302 is detected in the communication area where directivity 109bb of the phased array antennas of the antenna section 109 is formed.

Similarly, FIG. 10 shows that the access point 303 is detected in the communication area where directivity 109cc of the phased array antennas of the antenna section 109 is formed.

Figure 11:
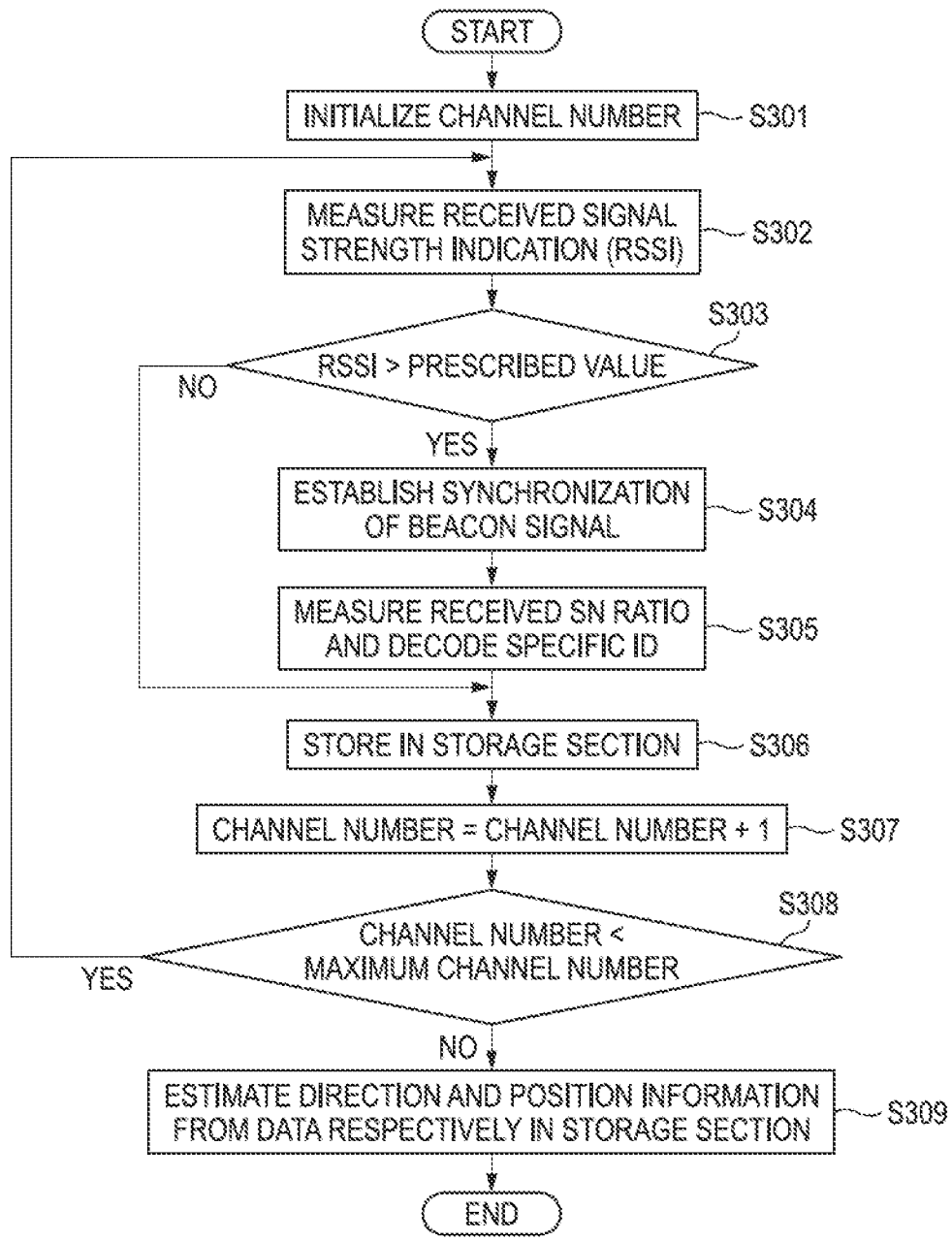
FIG. 11 is a flowchart for explaining an operation of the wireless communication device of the third exemplary embodiment.
Figure 12:
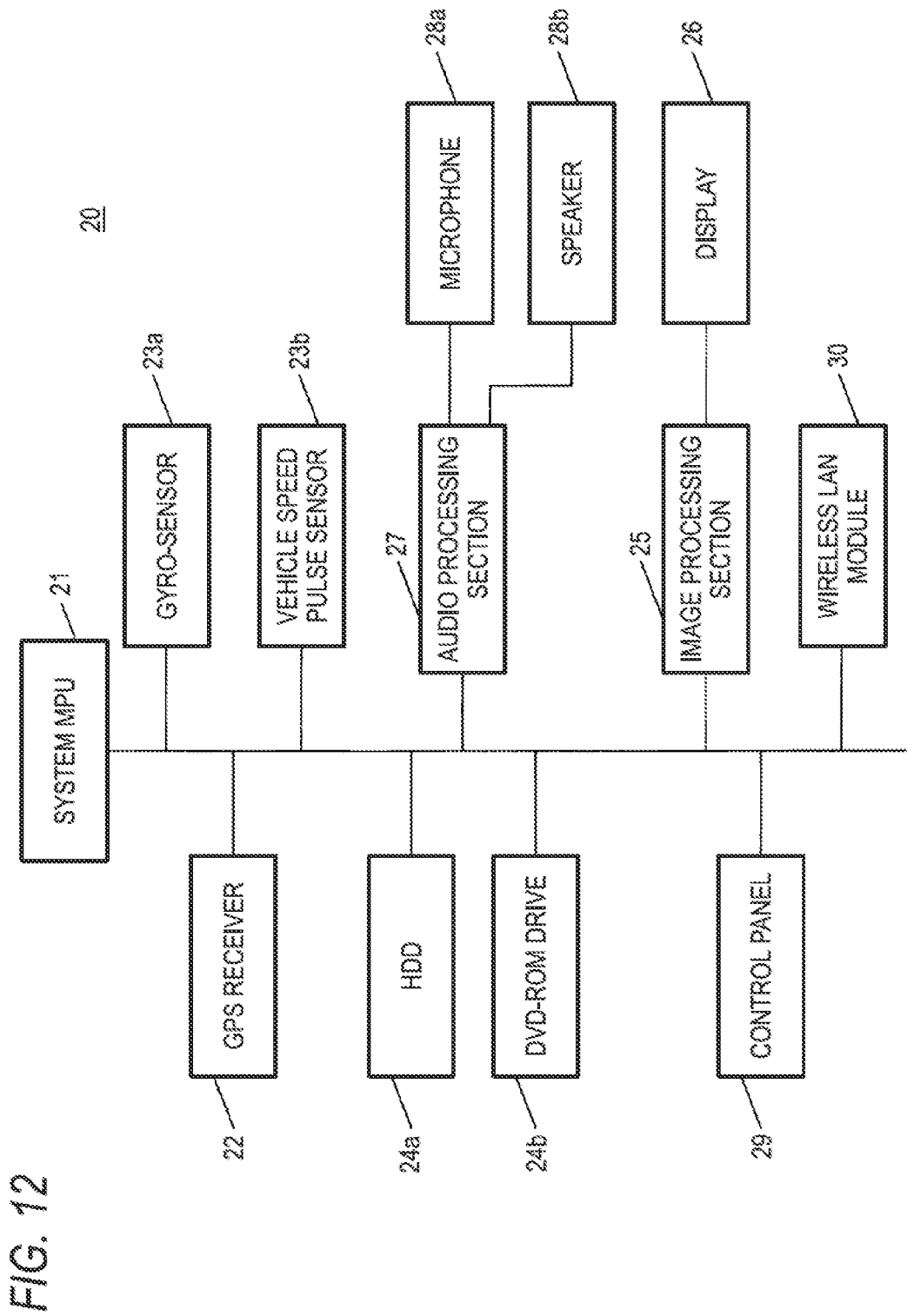
FIG. 12 is a block diagram showing an inner structure of a usual LAN device to be mounted on a vehicle.
Figure 13:
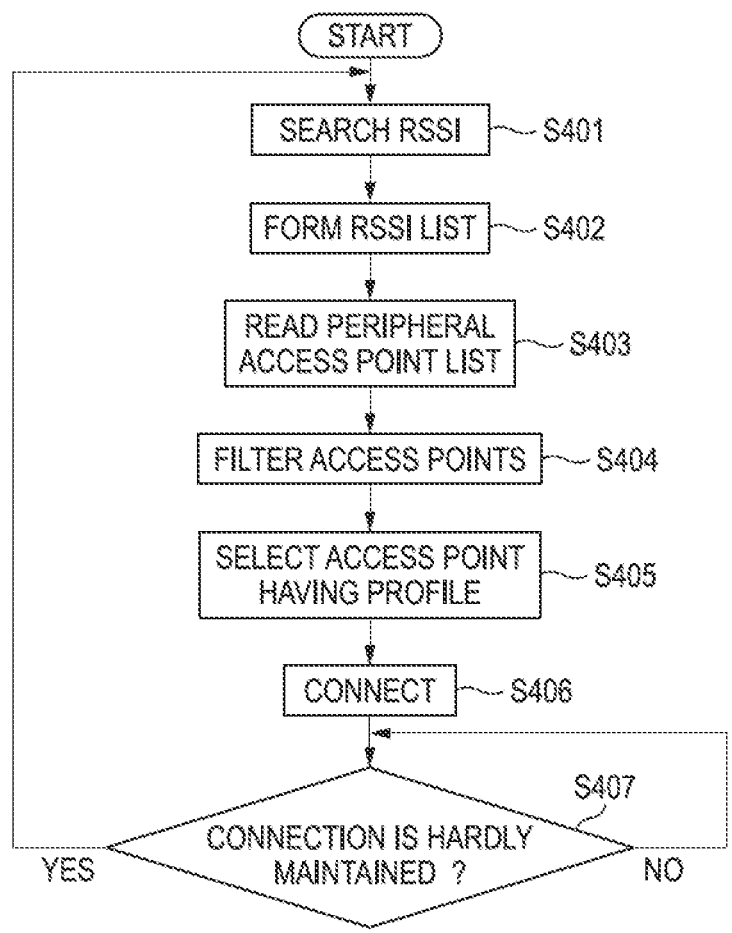
FIG. 13 is a flowchart for explaining a connecting procedure to a wireless LAN access point as a target for communication of the usual wireless LAN device to be mounted on the vehicle.

Now, an operation of the wireless communication device 100b will be described by referring to FIG. 11. FIG. 11 is a flowchart for explaining the operation of the wireless communication device 100b of the third exemplary embodiment. The wireless communication 100b is supposed to form the directivity in a prescribed direction by the phased array antennas of the antenna section 109 before the operation of the flowchart shown in FIG. 11.

In FIG. 11, the wireless section 110b initializes the number of the frequency channel in a millimeter wave frequency band (S301). Namely, the wireless section 110a sets the frequency channel in the millimeter wave frequency band capable of transmission and reception of the wireless communication device 100b to the channel 1. Information that the frequency channel is set to the channel 1 is stored in the storage section 106b.

The wireless section 110b measures a received signal strength indication located in the channel 1 in the millimeter wave frequency band (S302). When the measured received signal strength indication exceeds a prescribed value (S303, YES), the wireless section 110b moves to an operation for establishing a synchronization of the beacon signal (S304) to detect a preamble of the beacon signal and establishes the synchronization of the beacon signal (S304). After the wireless section 110b establishes the synchronization of the beacon signal, the wireless section 110b receives the beacon signal and outputs the beacon signal to the direction and position estimation section 104b. On the other hand, when the measured received signal strength indication is lower than the prescribed value (S303, NO), the wireless section 110a advances to step S306 to store only the information of the received signal strength indication in the storage section 106b.

The direction and position estimation section 104b inputs the beacon signal outputted by the wireless section 110b. The direction and position estimation section 104b demodulates a data area of the beacon signal in accordance with information of a header area of the inputted beacon signal. Further, the direction and position estimation section 104b derives the received signal strength indication and a received SN ratio of the beacon signal in accordance with data of the demodulated data area (S305). Further, the direction and position estimation section 104b extracts identification number information of the access point included in the header area of the beacon signal. In the identification number information, MAC addresses, an SSID or an ESSID or the like of the access points 301 to 303 are respectively included.

The direction and position estimation section 104b coordinates the extracted identification number information of the access points with the information of the received signal strength indication and the received SN ratio of the beacon signal derived in the step S305 and stores the information in the storage section 106b (S306).

Then, the wireless section 110b changes the frequency channel now set in the millimeter wave frequency band from the channel 1 to the channel 2 (S307). After that, the wireless communication device 100b repeats the above-described operations of the step S302 to the step S206 in all the frequency channels capable of transmission and reception (S308). For instance, when the frequency channel set at present is not the channel 2 which is a maximum channel number (S308, YES), the wireless communication device 100b sets the frequency channel in the millimeter wave frequency band to the channel 2. Further, the wireless communication device 100b detects whether or not the access points are respectively located in the communication areas of the directivities 109aa to 109cc formed by the phased array antennas of the antenna section 109.

As mentioned above, in the storage section 106b, below-described data is respectively stored correspondingly to the frequency channels and the directivities 109aa to 109cc of the antenna section 109. In the storage section 106b, the data of the received signal strength indication and the received SN ratio of the beacon signals received by the antenna 109a to 109c and the identification number information of the access points are respectively stored.

The direction and position estimation section 104b derives the direction and position information of the access points 301 to 303 respectively in accordance with the data stored in the storage section 106b, specifically, the received SN ratio (S309).

The direction and estimation section 104b can derive the directions of the access points 301 to 303 of the direction and position information with respect to the wireless communication device 100b by applying the above-described MUSIC method. For instance, when the beacon signal is received from the access point 301, direction information of the access point 301 is, as shown in FIG. 10, derived in accordance with the directivity of the antenna section 109 and angle information derived in accordance with the MUSIC method. Direction information of other access points 302 and 303 is similarly derived even when the beacon signals are respectively received.

Further, distance information (position information) of the wireless communication device 100a and the access points 301 to 303 respectively in the direction and position information is determined in accordance with a propagated distance of the beacon signal derived in accordance with the received SN ratio stored in the storage section 106b in the step S210.

Accordingly, the wireless communication device 100b of the third exemplary embodiment can derive the position and direction information to the access points 301 to 303 which are targets for communication via a simple configuration by using the millimeter wave frequency band like the above-described wireless communication devices 100 and 100*a*. Further, the wireless communication device 100*b* can simply realize a communication with the desired access points 301 to 303 in the prescribed direction with the high and narrow directivity and can effectively reduce a communication interference with the desired access points 301 to 303.

In the third exemplary embodiment, when the direction and position estimation section 104*b* estimates the direction of the access point, the direction and position estimation section 104*b* may refer to angle information detected by the gyro-sensor 108 to derive the direction of the access point in place of using the MUSIC method. In this case, the gyro-sensor 108 detects the angle information corresponding to a holding state of a user who holds the wireless communication device 100*b* and outputs the detected angle information respectively to the direction and position estimation section 104*b* and the storage section 106*b* through the data bus section 107*b*.

The various kinds of exemplary embodiments are described above by referring to the attached drawings, however, it is to be understood that the wireless communication device of the present invention is not limited to such examples. It is to be understood that a person with ordinary skill in the art may hit upon various kinds of changed examples or modified examples within a category described in claims. Thus, it is to be also understood that they belong to a technical range of the present invention. Further, the present invention is also established as a method by which the wireless communication devices of the exemplary embodiments are respectively operated.

In the above-described exemplary embodiment, the wireless communication devices 100, 100*a* and 100*c* respectively derive the direction and position information of the access points for each of the frequency channels of the millimeter wave frequency band capable of transmission and reception. Further, in the above-described exemplary embodiment, as the frequency channels, the two frequency channels of the channel 1 and the channel 2 are used.

In the above-described exemplary embodiments, the icons of the access points corresponding to the direction and position information may be displayed on the display section by using the direction and position information which shows a short distance from the wireless communication device in the direction and position information derived for each of the frequency channels.

Otherwise, in the above-described exemplary embodiments, the icons of the access points corresponding to the direction and position information may be displayed on the display section by using the direction and position information which shows a long distance from the wireless communication device in the direction and position information derived for each of the frequency channels.

Further, the wireless communication device may average the direction and position information derived respectively for the frequency channels and may display the icons of the access points corresponding to the direction and position information on the display section in accordance with the averaged direction and position information. In this case, in order to obtain a high estimation accuracy of the direction and position information of the access points, the icons of the access points are preferably displayed on the display section in accordance with the direction and position information obtained by averaging the direction and position information derived respectively for the frequency channels.

This application is based on Japanese Patent Application (Japanese Patent Application No. 2010-222765) filed on Sep. 30, 2010 and the contents of which are incorporated herein by reference.

INDUSTRIAL APPLICABILITY

The present invention is available as the wireless communication device which derives the position and direction information of a communication device to be communicated with, which is a target for communication via a simple configuration to realize a communication with a desired communication device to be communicated with and effectively reduces a communication interference with the desired communication device to be communicated with. The wireless communication device of the present invention is mounted on, for instance, a smart phone, a mobile terminal, a mobile telephone, a tablet, a portable game machine, a note PC, etc. and available as a device.

DESCRIPTION OF REFERENCE NUMERALS AND SIGNS

100, 100*a*, 100*b* . . . wireless communication device
101, 101*a*, 101*b* . . . display section
102, 109 . . . antenna section
102*a*, 102*b*, 102*c*, 102*d* . . . directional antenna
109*a*, 109*b*, 109*c* . . . antenna
102*aa*, 102*bb*, 102*cc*, 102*dd*, 102*ee*, 102*ff*, 109*aa*, 109*bb*, 109*cc* . . . directivity
103, 103*a*, 103*b* . . . antenna control section
104, 104*a*, 104*b* . . . direction and position estimation section
105, 105*a*, 105*b* . . . MPU section
106, 106*a*, 106*b* . . . storage section
107, 107*a*, 107*b* . . . data bus section
108 . . . gyro-sensor
109*d*, 109*e*, 109*f* . . . phase control section
300, 301*a*, 301*b*, 301*c* . . . icon
301, 302, 303 . . . access point

The invention claimed is:

1. A wireless communication device for transmitting and receiving a signal by wireless communication using a millimeter wave frequency band, the wireless communication device comprising:
   one or more antennas having directivities in a plurality of different directions;
   an antenna controller adapted to select and form a directivity in a prescribed direction among the plurality of directivities for the one or more antennas;
   a direction and position estimator adapted to estimate direction and position information of a target wireless communication device to be communicated with, which is a target of the wireless communication, in accordance with a reception signal received by the one or more antennas having the selected and formed directivity; and
   a display adapted to display the estimated direction and position information of the target wireless communication device,
   wherein the one or more antennas receive a specific information signal including identification information of the target wireless communication device transmitted from the target wireless communication device, and
   wherein the direction and position estimator derives a received signal SN ratio of the specific information signal from the received specific information signal, and estimates position information out of the direction and position information of the target wireless communication device based on the received signal SN ratio.

2. The wireless communication device according to claim 1, wherein a plurality of antennas are used as the one or more antennas, and the plurality of antennas have the directivities respectively in the plurality of different directions; and wherein the antenna controller switches between the plurality of antennas to select and form the directivity.

3. The wireless communication device according to claim 1, wherein the one or more antennas include one or more phase adjustors that adjust phases of reception signals respectively received by the one or more antennas; and
wherein the antenna controller sets, for the one or more phase adjustors, phase differences of prescribed quantities between transmission signals respectively transmitted from the one or more antennas.

4. The wireless communication device according to claim 1,
wherein when a value of received signal strength of a frequency channel in receiving the specific information signal exceeds a prescribed value, the direction and position estimator estimates the direction and position information of the target wireless communication device relative to the wireless communication device.

5. The wireless communication device according to claim 4, further comprising:
a storage configured to store the direction and position information estimated by the direction and position estimator,
wherein the direction and position estimator derives the value of received signal strength and the received signal SN ratio of the specific information signal from the received specific information signal, and stores the derived value of received signal strength, the received signal SN ratio, and the identification information of the target wireless communication device in the storage.

6. The wireless communication device according to claim 5, wherein the direction and position estimator switches from the frequency channel to a second frequency channel, and when a value of received signal strength of the second frequency channel exceeds the prescribed value, the direction and position estimator estimates the direction and position information of the target wireless communication device relative to the wireless communication device.

7. A wireless communication device for transmitting and receiving a signal by wireless communication using a millimeter wave frequency band, the wireless communication device comprising:
one or more antennas each having a directivity in a prescribed direction;
a gyro-sensor adapted to detect angle information corresponding to a position/orientation change of the wireless communication device;
a direction and position estimator adapted to estimate direction and position information of a target wireless communication device to be communicated with, which is a target of the wireless communication, in accordance with a reception signal received by the one or more antennas and the angle information; and
a display adapted to display the estimated direction and position information of the target wireless communication device,
wherein the one or more antennas receive a specific information signal including identification information of the target wireless communication device transmitted from the target wireless communication device, and
wherein the direction and position estimator derives a received signal SN ratio of the specific information signal from the received specific information signal, and estimates position information out of the direction and position information of the target wireless communication device based on the received signal SN ratio.

8. The wireless communication device according to claim 7,
wherein when a value of received signal strength of a frequency channel in receiving the specific information signal exceeds a prescribed value, the direction and position estimator estimates the direction and position information of the target wireless communication device relative to the wireless communication device.

9. A wireless communication method for transmitting and receiving a signal by wireless communication using a millimeter wave frequency band, through one or more antennas having directivities in a plurality of different directions, the wireless communication method comprising:
a step of selecting and forming a directivity in a prescribed direction among the plurality of directivities for the one or more antennas;
a step of receiving, with the one or more antennas, a specific information signal including identification information of a target wireless communication device transmitted from the target wireless communication device, and
a step of deriving a received signal SN ratio of the specific information signal from the received specific information signal;
a step of estimating direction information out of the direction and position information of the target wireless communication device, in accordance with a reception signal received by the one or more antennas having the selected and formed directivity;
a step of estimating position information out of the direction and position information of the target wireless communication device based on the received signal SN ratio of the specific information signal; and
a step of displaying the estimated direction and position information of the target wireless communication device.

10. A wireless communication method for transmitting and receiving a signal by wireless communication using a millimeter wave frequency band, through one or more antennas each having a directivity in a prescribed direction, the wireless communication method comprising:
a step of detecting angle information corresponding to a position/orientation change of the wireless communication device;
a step of receiving, with the one or more antennas, a specific information signal including identification information of a target wireless communication device transmitted from the target wireless communication device, and
a step of deriving a received signal SN ratio of the specific information signal from the received specific information signal;
a step of estimating direction information out of the direction and position information of the target wireless communication device, in accordance with a reception signal received by the one or more antennas and the angle information;
a step of estimating position information out of the direction and position information of the target wireless communication device based on the received signal SN ratio of the specific information signal; and
a step of displaying the estimated direction and position information of the target wireless communication device.

* * * * *